(12) United States Patent
Martin

(10) Patent No.: US 7,526,312 B2
(45) Date of Patent: *Apr. 28, 2009

(54) COMMUNICATION SYSTEM AND METHOD IN A HYBRID WIRED/WIRELESS LOCAL AREA NETWORK

(75) Inventor: Richard Martin, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 1302 days.

This patent is subject to a terminal disclaimer.

(21) Appl. No.: 10/607,094

(22) Filed: Jun. 26, 2003

(65) Prior Publication Data

US 2004/0081140 A1    Apr. 29, 2004

Related U.S. Application Data

(60) Provisional application No. 60/435,984, filed on Dec. 20, 2002, provisional application No. 60/411,301, filed on Sep. 17, 2002, provisional application No. 60/411,261, filed on Sep. 17, 2002.

(51) Int. Cl.
*H04M 1/00*    (2006.01)
*H04Q 7/10*    (2006.01)
(52) U.S. Cl. .................. 455/552.1; 455/451; 455/452.1
(58) Field of Classification Search ............. 455/552.1, 455/450, 451, 452.1, 453, 509; 370/329, 370/328, 401, 458, 331, 522, 352
See application file for complete search history.

(56) References Cited

U.S. PATENT DOCUMENTS

| | | | |
|---|---|---|---|
| 5,396,543 A | * | 3/1995 | Beeson et al. ............... 455/560 |
| 6,134,434 A | | 10/2000 | Krishnamurthi |
| 6,198,929 B1 | | 3/2001 | Krishnamurthi |
| 6,295,285 B1 | | 9/2001 | Whitehead |
| 6,434,137 B1 | | 8/2002 | Anderson et al. |
| 6,744,740 B2 | * | 6/2004 | Chen .......................... 370/255 |
| 2002/0102985 A1 | | 8/2002 | Amalfitano |
| 2002/0126631 A1 | | 9/2002 | Lee |

FOREIGN PATENT DOCUMENTS

| EP | 0849975 B1 | 6/1998 |
|---|---|---|
| WO | WO01/63952 B2 | 8/2001 |
| WO | WO97/31495 B1 | 3/2007 |

* cited by examiner

*Primary Examiner*—Melur Ramakrishnaiah
(74) *Attorney, Agent, or Firm*—McAndrews, Held & Malloy, Ltd.

(57) ABSTRACT

Aspects of the invention provide a system and method for communicating in a hybrid wired/wireless local area network. A method for communicating in a hybrid wired/wireless local area network may include communicating at least a first messaging protocol message between a first switch and at least one of a second switch and a first access point. In response to the first messaging protocol message, at least a second messaging protocol (MP) message may be communicated between the second switch, first access point, and/or a second access point. The first switch, second switch, first access point, second access point, and/or one or more access devices may be controlled using the second messaging protocol message and/or the first messaging protocol message.

30 Claims, 15 Drawing Sheets

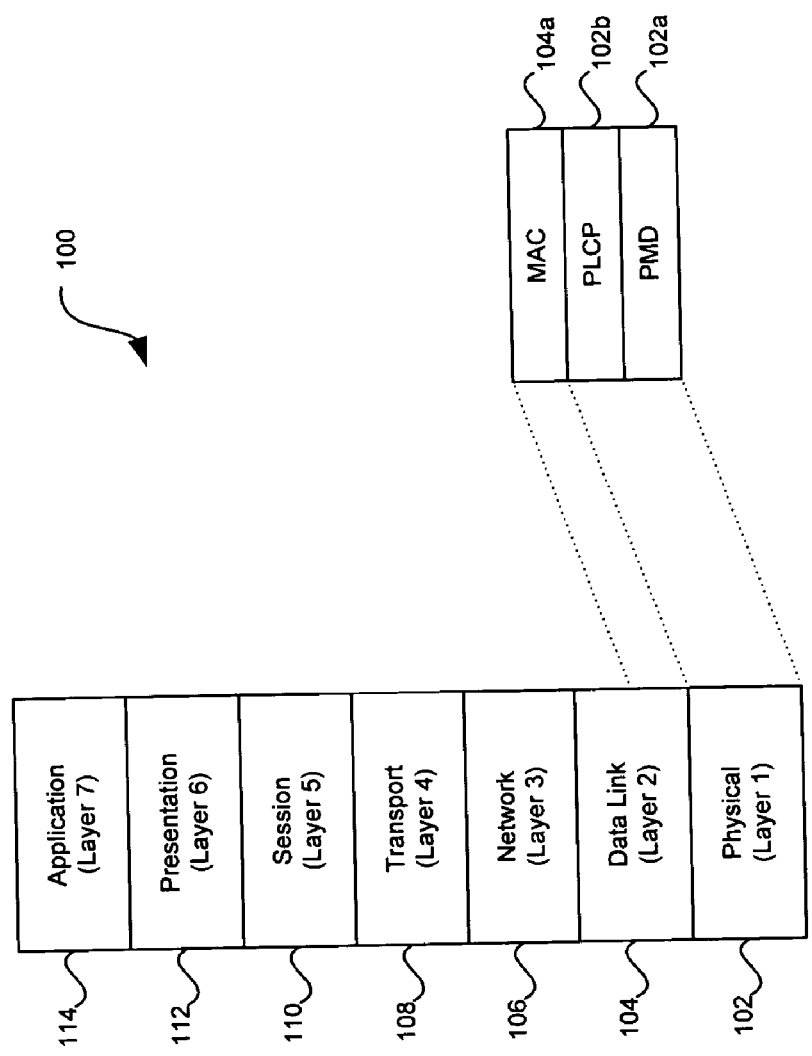

COMMUNICATION SYSTEM AND METHOD IN A HYBRID WIRED/WIRELESS LOCAL AREA NETWORK

CROSS-REFERENCE TO RELATED APPLICATIONS/INCORPORATION BY REFERENCE

This application makes reference to, claims priority to and claims the benefit of:

U.S. Provisional Patent Application No. 60/411,261 entitled "Communications Systems Software and Protocols" filed on Sep. 17, 2002; This application makes reference to, claims priority to and claims the benefit of:

U.S. Provisional Patent Application No. 60/411,301 entitled "Method and System for Providing a Scalable Integrated Switch and Wireless Architecture" filed on Sep. 17, 2002; and U.S. Provisional Application Ser. No. 60/435,984 entitled "Communication System and Method in a Wireless Local Area Network" filed on Dec. 20, 2002.

The above stated applications are all incorporated herein by reference in their entirety.

BACKGROUND OF THE INVENTION

Embodiments of the present application relate generally to local area networks, and more particularly to a communication method and system in a hybrid wired/wireless local area network (WLAN).

The Open Systems Interconnection (OSI) model promulgated by the International standards organization (ISO) was developed to establish standardization for linking heterogeneous computer and communication systems. The OSI model describes the flow of information from a software application of a first computer system to a software application of a second computer system through a network medium. FIG. 1a is a block diagram 100 of the OSI model. Referring to FIG. 1a, the OSI model has seven distinct functional layers including layer 7, an application layer 114; layer 6, a presentation layer 112; layer 5, a session layer 110; layer 4, a transport layer 108, layer 3, a network layer 106; layer 2, a data link layer 104; and layer 1, a physical layer 102. The physical layer 102 may further include a physical layer convergence procedure (PLCP) sublayer 102b and a physical media dependent sublayer 102a. The data link layer 104 may also include a Medium access control (MAC) layer 104a.

In general, each OSI layer describes certain tasks which are necessary for facilitating the transfer of information through interfacing layers and ultimately through the network. Notwithstanding, the OSI model does not describe any particular implementation of the various layers. OSI layers 1 to 4 generally handle network control and data transmission and reception, generally referred to as end-to-end network services. Layers 5 to 7 handle application issues, generally referred to as application services. Specific functions of each layer may vary depending on factors such as protocol and/or interface requirements or specifications that are necessary for implementation of a particular layer. For example, the Ethernet protocol may provide collision detection and carrier sensing in the physical layer. Layer 1, the physical layer 102, is responsible for handling all electrical, optical, opto-electrical and mechanical requirements for interfacing to the communication media. Notably, the physical layer 102 may facilitate the transfer of electrical signals representing an information bitstream. The physical layer 102 may also provide services such as, encoding, decoding, synchronization, clock data recovery, and transmission and reception of bit streams.

The PLCP layer 102b may be configured to adapt and map services provided by the physical layer 102 to the functions provided by the device specific PMD sublayer 102a. Specifically, the PLCP layer 102b may be adapted to map PHY sublayer service data units (PDSUs) into a suitable packet and/or framing format necessary for providing communication services between two or more entities communicating via the physical medium. The PMD layer 102a specifies the actual methodology and/or protocols which may be used for receiving and transmitting via the physical medium. The MAC sublayer 104a may be adapted to provide, for example, any necessary drivers which may be utilized to access the functions and services provided by the PLCP sublayer 102b. Accordingly, higher layer services may be adapted to utilize the services provided by the MAC sublayer 104a with little or no dependence on the PMD sublayer 102a.

802.11 is a suite of specifications promulgated by the Institute of Electrical and Electronics Engineers (IEEE), which provide communication standards for the MAC and physical (PHY) layer of the OSI model. The 801.11 standard also provides communication standards for wired and wireless local area networks (WLANs). More specifically, the 802.11 standard specifies five (5) types of physical layers for WLANs. These include, frequency hopping spread spectrum (FHSS), direct sequence spread spectrum (DSSS), infrared (IR) communication, high rate direct sequence spread spectrum spread spectrum (HR-DSS) and orthogonal frequency division multiplexing (OFDM). The 802.11 standard also provides a PLCP frame format for each of the specified PHY layers.

Over the past decade, demands for higher data rates to support applications such as streaming audio and streaming video, have seen Ethernet speeds being increased from about 1-2 megabit per second (Mbps), to 10 Mbps, to 100 Mbps, to 1 gigabit per second (Gbps) to 10 Gbps. Currently, there are a number of standards in the in the suite of specifications, namely 802.11b, 802.11a and 802.11g which have been adapted to facilitate the demands for increased data rates. The 802.11g standard for example, provides a maximum data rate of about 54 Mbps at a transmitter/receiver range of 19 meters (m) in a frequency range of 2.4 GHz to 2.4835 GHz. The 802.11b standard for example, provides a maximum data rate of about 11 Mbps at a transmitter/receiver range of 57 meters (m) in a frequency range of 2.4 GHz to 2.4835 GHz. Finally, the 802.11a standard for example, may be adapted to provide a maximum data rate of about 54 Mbps at a transmitter/receiver range of 12 meters (m) in a 300 MHz segmented bandwidth ranging from 5.150 GHz to 5.350 GHz and from 5.725 GHz to 5.825 GHz.

The 802.11 standard forms the basis of the other standards in the suite of specifications, and the 802.11b, 802.11a and 802.11g standards provide various enhancements and new features to their predecessor standards. Notwithstanding, there are certain elementary building blocks that are common to all the standards in the suite of specifications. For example, all the standards in the suite of specifications utilize the Ethernet protocol and utilize carrier sense multiple access with collision avoidance (CSMA/CA) for distribution coordination function (DCF) and point coordination function (PCF).

CSMA/CA utilizes a simple negotiation scheme to permit access to a communication medium. If a transmitting entity wishes to transmit information to a receiving entity, the transmitting entity may sense the communication medium for communication traffic. In a case where the communication medium is busy, the transmitting entity may desist from making a transmission and attempt transmission at a subsequent time. In a case where the communication transmission is not busy, then the transmitting entity may send information over the communication medium. Notwithstanding, there may be a case where two or more transmission entities sense that the communication medium is not busy and attempt transmission at the same instant. To avoid collisions and retransmissions, a CSMA/OA or ready to send (RTS) and clear to send (CTS) messaging scheme may be employed, for example. Accordingly, whenever a transmitting device senses that the communication medium is not busy, then the transmitting device may send a ready to send message to one or more receiving device. Subsequent to the receipt of the ready to send message, the receiving device may send a clear to send message. Upon receipt of the clear to send message by the transmitting device, the transmitting device may initiate transfer of data to the receiving device. Upon receiving packets or frames from the transmitting device, the receiving device may acknowledge the received frames.

The 802.11b standard, commonly called Wi-Fi, which represents wireless fidelity, is backward compatible with its predecessor standard 802.11. Although 802.11 utilizes phase-shift keying (PSK) as a modulation scheme, 802.11b utilizes a hybrid PSK scheme called complementary code keying (CCK). CCK permits higher data rate and particularly less susceptible to interference effects such as multipath-propagation interference, the PSK.

The 802.11a standard provides wireless asynchronous transfer mode (ATM) support and is typically utilized in access hubs. 802.11a utilizes orthogonal frequency-division multiplexing (OFDM) modulation/encoding scheme, which provides a maximum data rate 54 Mbps. Orthogonal frequency-division multiplexing is a digital modulation technique which splits a signal into several narrowband channels, with each channel having a different frequency. Each narrowband channel is arranged so as to minimize the effects of crosstalk between the channels and symbols in the data stream.

Since equipment designed to provide support for 802.11a operates at frequencies in the ranges 5.150 GHz to 5.350 GHz and from 5.725 GHz to 5.825 GHz, 802.11a equipment will not interoperate with equipment designed to operate with the 802.11b standard which defines operation in the 2.4 to 2.4835 GHz frequency band. One major drawback is that companies that have invested in 802.11b equipment and infrastructure may not readily upgrade their network without significant expenditure.

The 802.11g standard was developed as an extension to 802.11b standard. The 802.11g standard may utilize a similar OFDM modulation scheme as the 802.11a standard and delivers speeds comparable with the 802.11a standard. Since 802.11g compatible equipment operates in the same portion of the electromagnetic spectrum as 802.11b compatible equipment, 802.11g is backwards compatible with existing 802.11b WLAN infrastructures. Due to backward compatibility of 802.11g with 802.11b, it would be desirable to have an 802.11b compliant radio card capable of interfacing directly with an 802.11g compliant access point and also an 802.11g compliant radio card capable of interfacing directly with an 802.11b compliant access point.

Furthermore although 802.11g compatible equipment operates in the 2.4 GHz to 2.4835 GHz frequency range, a typical transmitted signal utilizes a bandwidth of approximately 22 MHz, about a third or 30% of the total allocated bandwidth. This limits the number of non-overlapping channels utilized by an 802.11g access point to three (3). A similar scenario exists with 802.11b. Accordingly, many of the channel assignment and frequency reuse schemes associated with the 802.11b standard may be inherent in the 802.11g.

RF interference may pose additional operational problems with 802.11b and 802.11g equipment designed to operate in the 2.4 GHz portion of the electromagnetic spectrum. The 2.4 GHz portion of the spectrum is an unlicensed region which has been utilized for some time and is crowded with potential interfering devices. Some of these devices include cordless telephone, microwave ovens, intercom systems and baby monitors. Other potential interfering devices may be Bluetooth devices. Accordingly, interference poses interference problems with the 802.11b and 802.11g standards.

802.11a compatible equipment utilizes eight non-overlapping channels, as compared to three non-overlapping channels utilized by 802.11b. Accordingly, 802.11a access points may be deployed in a more dense manner than, for example 802.11b compatible equipment. For example, up to twelve access points each having a different assigned frequency may be deployed in a given area without causing co-channel interference. Consequently, 802.11a may be particularly useful in overcoming some of the problems associated with channel assignment, especially in areas that may have a dense user population and where increased throughput may be critical. Notwithstanding, the higher operating frequency of 802.11a along with its shorter operating range, may significantly increase deployment cost since a larger number of access points are required to service a given service area.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide a system and method for communicating in a hybrid wired/wireless local area network. A method for communicating in a hybrid wired/wireless local area network may include communicating at least a first messaging protocol message between a first switch and at least one of a second switch and a first access point. In response to the first messaging protocol message, at least a second messaging protocol (MP) message may be communicated between the second switch, first access point, and/or a second access point. The first switch, second switch, first access point, second access point, and/or one or more access devices may be controlled using the second messaging protocol message and/or the first messaging protocol message.

The method may further include generating the first messaging protocol message by the first switch. The second messaging protocol message may be generated by the second switch and/or the first access point. The first messaging protocol message and the second messaging protocol message may be, for example, (1) an access point status message, which may be communicated between the first access point and the second access point; (2) an access point configuration message, which may be communicated from the first switch and/or the second switch, to the first access point and/or the second access point; (3) a switch status message, which may be communicated between the first switch and the second switch; (4) a switch configuration message, which may be communicated between the first switch and the second switch; (5) a client status message, which may be communicated from the first access point and/or the second access point to the first switch and/or the second switch; (6) a device discovery message, which may be communicated between the first switch and the second switch, between the first switch and at least one of the first access point and the second access point, and between the first access point and at least one of the second access point and one or more of the access devices; and/or (7) a switch status message, which may be communicated between the first switch and the second switch.

Another embodiment of the invention provides a machine-readable storage, having stored thereon a computer program having at least one code section for providing communication in a hybrid wired/wireless local area network, the code at least one code section executable by a machine for causing the machine to perform the steps described above.

Another embodiment of the invention may provide a system for communicating in a hybrid wired/wireless local area network. The system may include means for communicating at least a first messaging protocol message between a first switch and a second switch and/or a first access point. The system may include means for communicating at least a second messaging protocol message between the second switch and/or the first access point, and a second access point, in response to the first messaging protocol message. Means for controlling the first switch, the second switch, the first access point, the second access point, and/or at least one or more access devices using the second messaging protocol message may also be provided. In another aspect of the invention, means for generating the first messaging protocol message by the first switch may be provided. Means for generating the second messaging protocol message by the second switch and/or the first access point may also be provided.

The first messaging protocol message and the second messaging protocol message generated by the system may be, for example, (1) an access point status message, which may be communicated between the first access point and the second access point; (2) an access point configuration message, which may be communicated from the first switch and/or the second switch, to the first access point and/or the second access point; (3) a switch status message, which may be communicated between the first switch and the second switch; (4) a switch configuration message, which may be communicated between the first switch and the second switch; (5) a client status message, which may be communicated from the first access point and/or the second access point to the first switch and/or the second switch; (6) a device discovery message, which may be communicated between the first switch and the second switch, between the first switch and at least one of the first access point and the second access point, and between the first access point and at least one of the second access point and one or more of the access devices; and/or (7) a switch status message, which may be communicated between the first switch and the second switch.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1a is a block diagram of the OSI model.

DETAILED DESCRIPTION OF THE INVENTION

Aspects of the invention provide a system and method for communicating in a hybrid wired/wireless local area network. A method for communicating in a hybrid wired/wireless local area network may include communicating at least a first messaging protocol message between a first switch and at least one of a second switch and a first access point. In response to the first messaging protocol message, at least a second messaging protocol (MP) message may be communicated between the second switch, first access point, and/or a second access point. The first switch, second switch, first access point, second access point, and/or one or more access devices may be controlled using the second messaging protocol message and/or the first messaging protocol message.

Figure 1B:
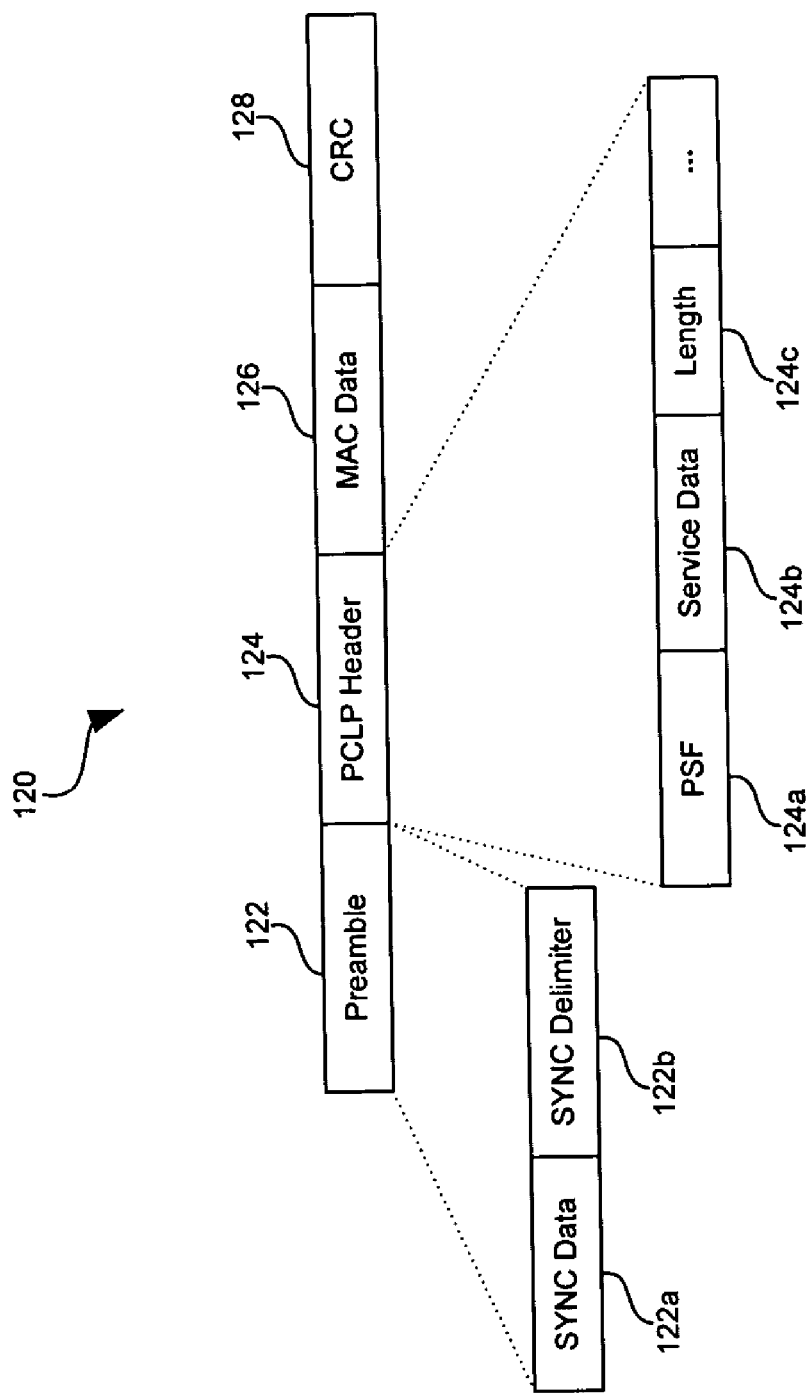
FIG. 1b is a block diagram illustrating a general PLCP frame as defined by 802.11.

FIG. 1b is a block diagram 120 illustrating a general PLCP frame as defined by 802.11. Referring to FIG. 1b, there is shown preamble 122, PLCP header 124, MAC data 126, and CRC 128. Preamble 122 may include synchronization (SYNC) data 122a and synchronization delimiter 122b. The PLCP header 124 may include, for example PLCP signal field (PSF) 124a, service data 124b, length 124c and other fields. The preamble 122 may be dependent on the PHY. The SYNC data 122a may include a unique bit stream that may be adapted to signal timing parameters such as the start of a frame. The SYNC data 122a is used for bit synchronization and demodulation. The SYNC delimiter 122b provides frame timing information and may be adapted to delimit the end of synchronization information. The PLCP header 124 may be adapted to contain information used for decoding the frame. For example, the PSF 124a may be adapted to include communication data rate information. The service data 124b is generally reserved, but may be utilized to provide application specific functionality. The length 124c may be adapted to indicate the length of the MAC data 126. In this regard, the length 124c may be expressed in terms of the time required to transmit the MAC data 126.

Figure 1C:
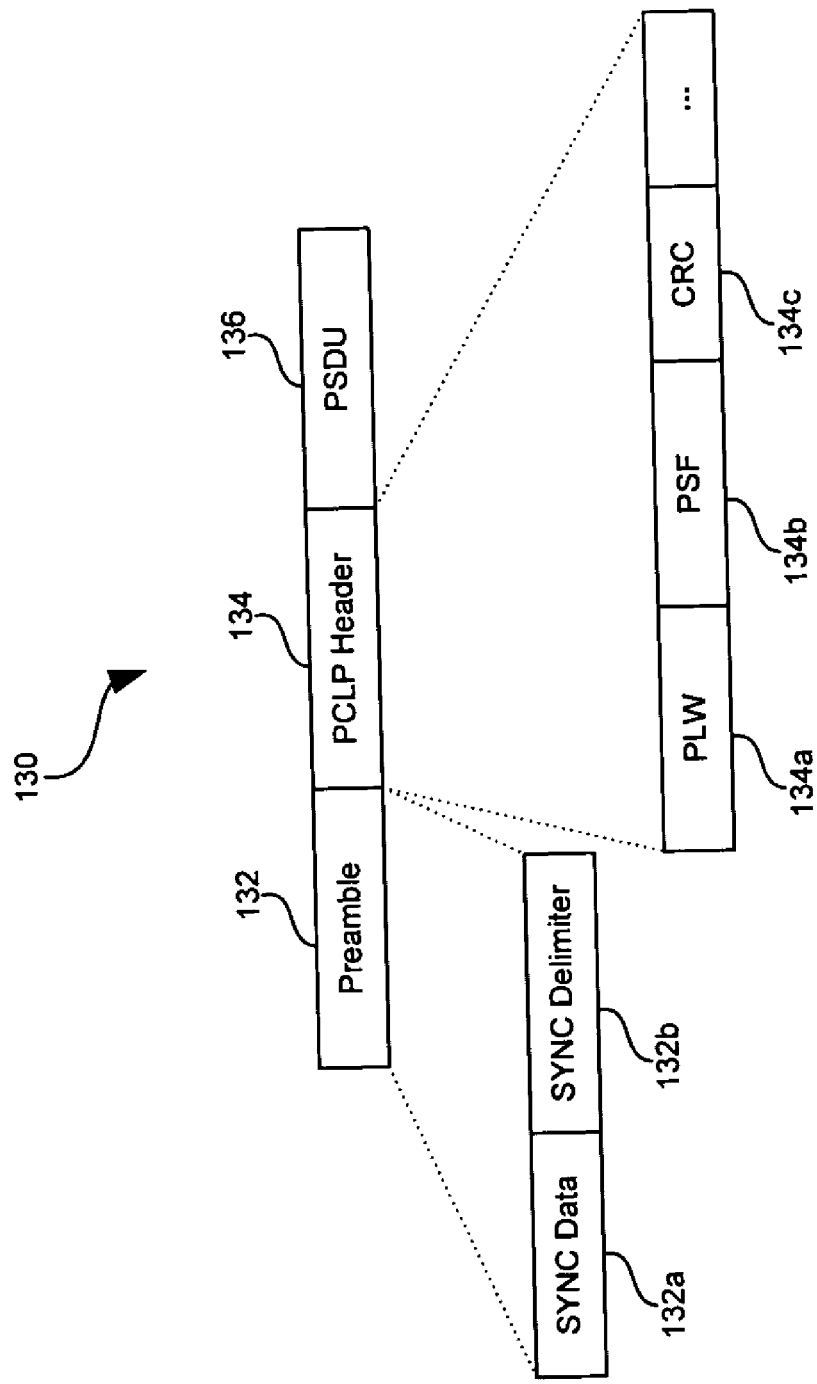
FIG. 1c is a block diagram illustrating a PLCP frame utilized by frequency hopping spread spectrum as defined by 802.11.

FIG. 1c is a block diagram 130 illustrating a PLCP frame utilized by frequency hopping spread spectrum as defined by 802.11. Referring to FIG. 1c, there is shown a SYNC data 132, PLCP header 134 and PSDU 136. The PLCP header 134 may include, for example, PSDU length word (PLW) 134a, PLCP signaling field (PSF) 134b, header error check field or CRC 134c and other fields. The PLW 134a may specify the number of octets contained in the PSDU 136. The PSF 134b may be 4-bits in length and may be used to denote the communication data rate.

Figure 1D:
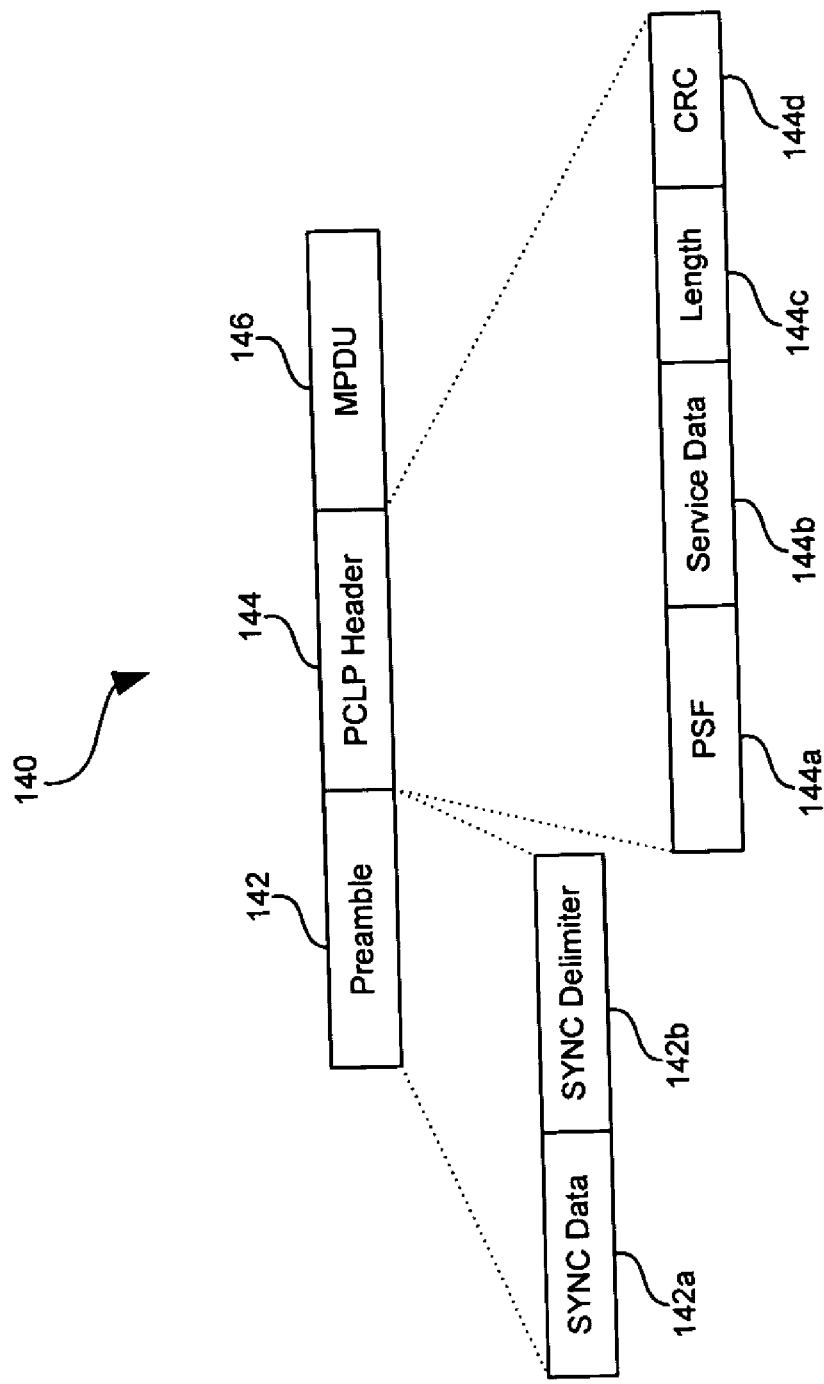
FIG. 1d is a block diagram illustrating a PLCP frame for direct sequence spread spectrum and high rate direct sequence spread spectrum as defined by 802.11.

FIG. 1d is a block diagram 140 illustrating a PLCP frame for direct sequence spread spectrum and high rate direct sequence spread spectrum (HR-DSS) as defined by 802.11. Referring to FIG. 1d, there is shown preamble 142, PLCP header 144 and MPDU 146. Preamble 142 may include synchronization (SYNC) data 142a and synchronization delimiter 142b. The PLCP header 144 may include PLCP signal field (PSF) 144a, service data 144b, length 144c, and CRC field 144d. The SYNC data 142a may be 128 bits as compared to 8 bits for SYNC data 132a for frequency hopping spread spectrum. The CRC 144d is 16 bits, which is similar to CRC 134c for frequency hopping spread spectrum.

Figure 1E:
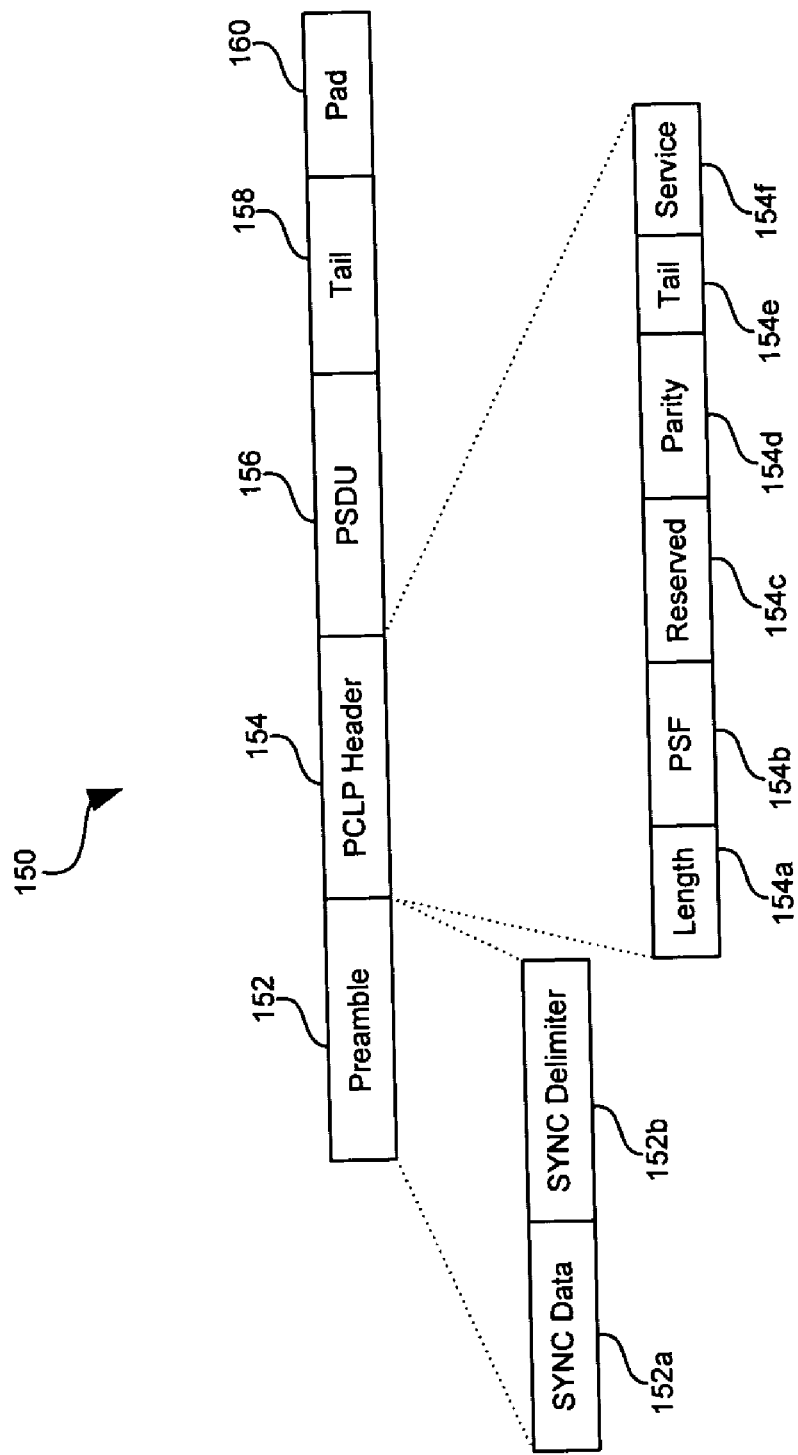
FIG. 1e is a block diagram illustrating a PLCP frame for orthogonal frequency division multiplexing as defined by 802.11.

FIG. 1e is a block diagram 150 illustrating a PLCP frame for orthogonal frequency division multiplexing as defined by 802.11. Referring to FIG. 1e, there is shown preamble 152, PLCP header 154 and PSDU 156, tail 158 and pad 160. Preamble 152 may include synchronization (SYNC) data 152a and synchronization delimiter 152b. The PLCP header 154 may include length 154a, PLCP signal field (PSF) 154b, reserved field 154c, parity 154d, tail 154e and service 154f. The length 154a is a 12-bit field that may be adapted to indicate the length of the frame. The PSF 154b is a 4-bit field that may indicate a modulation scheme utilized and its associated coding rate of the PSDU. For example, the specification utilizes binary 1011 to represent 6 Mbps, 1111 to represent 9 Mbps, 1010 to represent 12 Mbps, 1110 to represent 18 Mbps, 1001 to represent 24 Mbps, 1011 to represent 36 Mbps, 1000 to represent 48 Mbps and finally, 1100 to represent the maximum standardized rate if 54 Mbps. The reserved field 154c is a 1 bit field that is reserved for future use and may be adapted for application specific use. The parity field 154d may indicate odd or even parity. The tail field 154e is a 6-bit field. The service field 154f is a 16-bit field that may be adapted to indicate the type of service.

In a typical wireless local area network, especially as access devices become mobile throughout the network, channel capacity may be rapidly time varying. For example, when the distance from an access device to an access point increases or decreases due to mobility, the channel capacity and ultimately the channel throughput may change with time. In accordance with an embodiment of the invention, a switch for example, may utilize the messaging protocol to facilitate communication between one or more of a plurality of access devices and/or access points, and/or other switches. The messaging protocol may be adapted to provide, for example, switch filter transfer, bandwidth management, session control and management, load balancing and QoS control and management.

In, for example, a hybrid wired/wireless in which bandwidth is rapidly changing over time due to access device mobility, the messaging protocol in accordance with an aspect of the invention may be adapted to perform bandwidth management for a wired and/or a wireless portion of the network. The bandwidth management may include, but is not limited to, performing one or more tasks including, but not limited to, implementing policies, tracking bandwidth usage and adapting bandwidth allocation to meet user demands and system capability. The management of these tasks may pertain to providing mobility and operability throughout a hybrid wired/wireless communications network.

Figure 2:
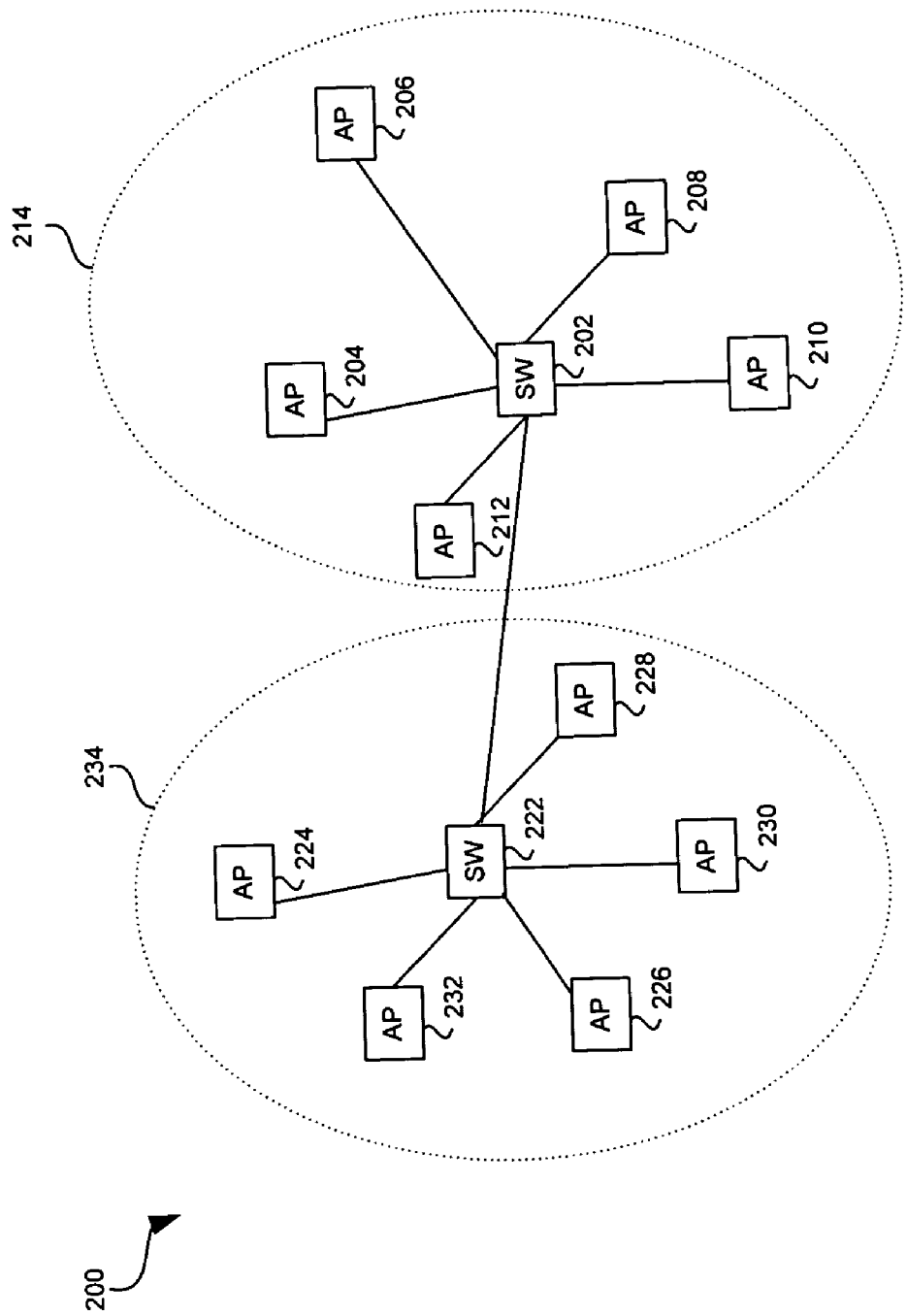
FIG. 2 is a block diagram of an exemplary system for network management in a wireless local area network in accordance with an embodiment of the invention.

FIG. 2 is a block diagram of an exemplary system for network management in a wireless local area network in accordance with an embodiment of the invention. Referring to FIG. 2, there is illustrated a first networking domain 214 and a second networking domain 234. The first networking domain 214 may include a switch 202, and access points 204, 206, 208, 210, 212. Each of access points 204, 206, 208, 210, 212 may be coupled to the switch 202. The second networking domain 234 may include a switch 222, and access points 224, 226, 228, 230, 232. Each of access points 224, 226, 208, 230, 232 may be coupled to the switch 222. Switch 222 may be coupled to switch 202 through any one or more of a wired and a wireless medium. Although not shown, at least some of the access points in any one of the networking domains 214, 234 may be coupled to each other. Notwithstanding, a plurality of actual and/or virtual channels may be provided to facilitate communication with the access points and switches. Although the networking domains 214 and 234 are illustrated as separate networking entities, the invention is not so limited. Accordingly, the networking domain 214, 234 may be part of a single networking entity, but may represent separate security domains within the single networking entity.

In operation, any one or more of the access points in any one or more of the networking domains 214, 234 may be adapted to receive network management related information and parameters from one or more of the switches 202, 222. In one embodiment of the invention, for example, access point 206 may be adapted to receive for example, bandwidth information from switch 202. Similarly, any one or more of access points 204, 208, 210, 214 may receive network management related information from switch 202. Similarly, any one or more of access points 224, 226, 228, 230, 232 may receive network management related information from switch 222.

In another aspect of the invention, the switches 202, 222 may be adapted to provide, for example, certain QoS management activities to the access points using the messaging protocol in accordance with an aspect of the invention. Accordingly, some activities such as bandwidth policing, bandwidth management, load balancing, roaming and handover may be handled by coordinating one or more switches and one or more access points utilizing the messaging protocol in accordance with an embodiment of the invention. Notwithstanding, a switch for example 222, may be adapted to establish rules that may be adapted by the access points 224, 226, 228, 230, 232 in carrying out these activities. The rules may be propagated from the switches 222, 202 to the access points 204, 208, 210, 214, 224, 226, 228, 230, 232 using the messaging protocol. Prioritization and processing, for example, may be based on acceptable levels of latency and bandwidth availability. For example, an IP telephone call may be assigned highest queuing and processing priority in order to minimize latency. Policing, for example, may include tasks which limit and control the usage of available bandwidth by a particular access device or a type of access device. All these tasks may be controlled using the messaging protocol.

In accordance with an aspect of the invention, the messaging protocol (MP) may be utilized for communication by an access device in, for example, an enterprise Wireless LAN (WLAN), in order to provide services such as enhanced WLAN service to access devices or mobile stations. The communication, in addition to ordinary WLAN device communication such as authentication, authorization, key exchanges, beacon broadcast, etc., may provide additional features not provided by a WLAN to its clients. These additional features may include, but are not limited to, access control, load balancing, network management and quality of service. Enterprise WLAN devices that may utilize messaging protocol message transactions may include but are not limited to, wireless access points, enterprise switches, and wireless stations. These devices may be MP enabled in some instances.

In accordance with the invention, an exemplary WLAN Architecture may be provided. In the enterprise Wireless LAN environment, the wireless devices may be located at the edge of the network. The wireless devices may be connected or coupled to the enterprise network via the one or more access points, which in turn may be the edge devices of, for example, a wired LAN. The access points may be connected to the LAN via switches. These switches, called Wireless LAN Switches, in certain instances, do not only perform Layer 2 switching, but may be adapted to function as a wireless edge manager. They may also provide additional functionalities like access control, firewall functions, traffic privacy and quality of service, network management, and load balancing.

Figure 3:
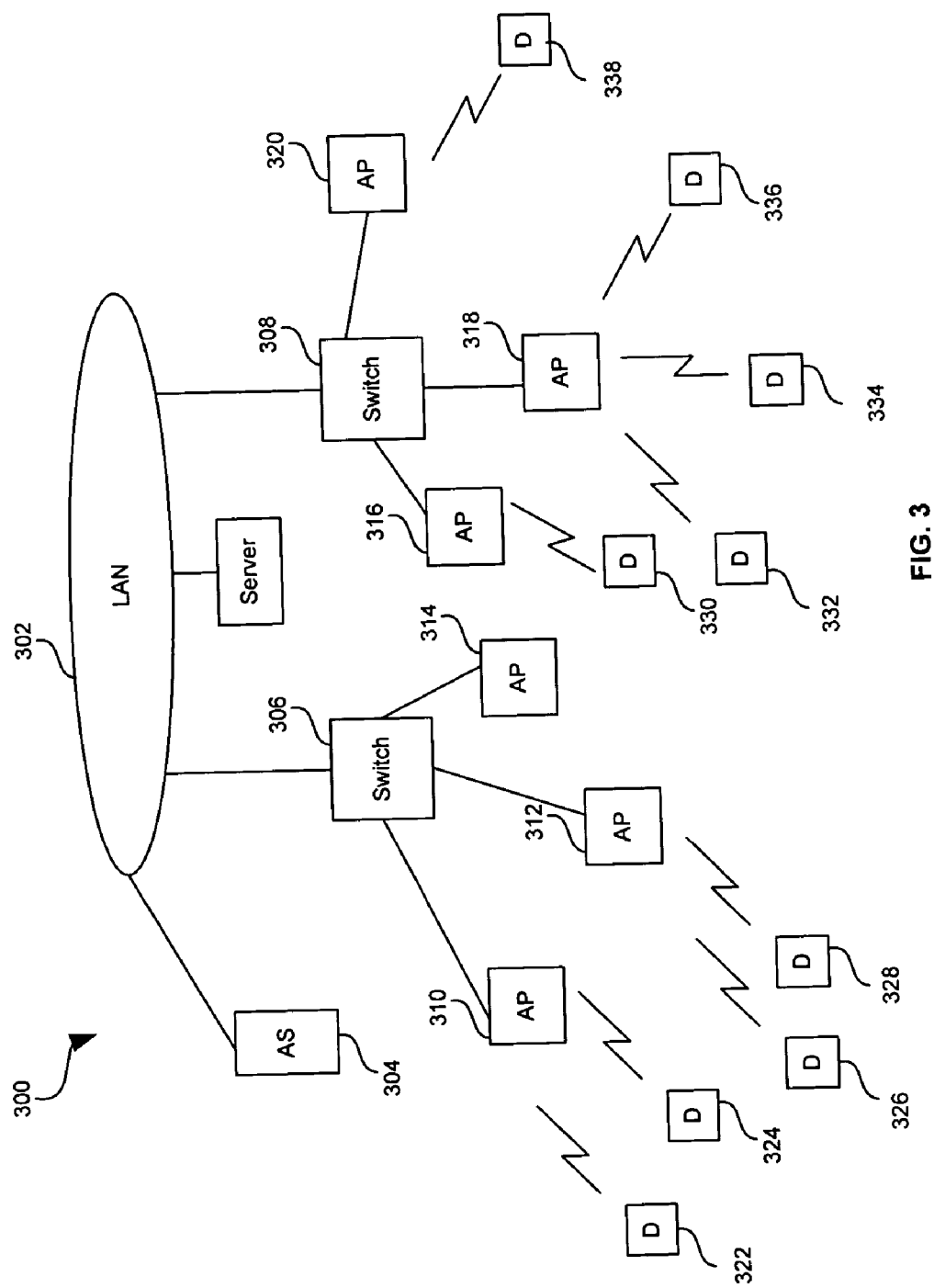
FIG. 3 is a block diagram of an exemplary Enterprise Wireless LAN having switches serving as the edge managers in accordance with an embodiment of the invention.

FIG. 3 is a block diagram 300 of an exemplary Enterprise Wireless LAN having switches serving as the edge managers in accordance with an embodiment of the invention. Referring to FIG. 3, there is shown, a local area network (LAN) 302, authentication server 304, switches 306, 308, access points (APs) 310, 312, 314, 316, 318, 320 and access devices 322, 324, 326, 328, 330, 332, 334, 336, 338. It should be recognized that the invention is not limited to and Enterprise WLAN. The invention may be applicable to a wired LAN, a wireless LAN and any combination thereof.

Wireless transmission or communication between the access devices or clients, and the access points may be secure. This may be also true for the wired connections between any of the access points 310, 312, 314, 316, 318, 320 and the switches 306, 308. The switches 306, 308 and access points 310, 312, 314, 316, 318, 320 may be adapted to communicate using, for example, an Ethernet protocol. From the switch's perspective, the switch may be switching regular layer 2 frames. Within the switch, knowledge of a WLAN and its management intelligence may reside primarily in software.

The messaging protocol, in accordance with an aspect of the invention, may be adapted to utilize one or more protocols associated with a device communication protocol (DCP) umbrella (DCPU). The messaging protocol may be adapted to run over the transmission control protocol (TCP) or user datagram protocol (UDP) protocols using for example, a well-known port number specified under the framework of the device communication protocol. Under the DCP umbrella, there may be several sub-protocols defined for the purpose of facilitating interoperability with other products. Some of these products may include but are not limited to, cable modems and cable modem termination systems (CMTS) equipment. The messaging protocol may be adapted to include the necessary protocols under DCP to facilitate communication for wired and/or WLAN devices.

DCP is a Layer 5 protocol. It may be adapted to use a default TCP/UDP port of for, example, 3188, which is a registered IETF port assignment. A DCP header, starting from the TCP/UDP payload, may have a 6-byte header as follows:

| RCM_MAGIC_NUMBER | RCM_SubProtocol | Sub_Protocol Specifics |
|---|---|---|
| octets 0-3 (=0x4252434d, or "RCM") | octets 4-5 | Variant # octets |

The RCM_SubProtocol field may indicate an officially registered sub-protocol for other devices. Exemplary valid values may be illustrated in the following table:

| RCM_SubProtocol | Description |
|---|---|
| 0x0000 | Reserved |
| 0x0001 | Propane Control Protocol (PCP) |
| 0x0002 | Inter-CMTS Communications Protocol (ICCP) |
| 0x0003 | imPulse Mitigation Signaling Protocol (PMSP) |
| 0x0004 | Loadbox Signaling Protocol (LBSP) |
| 0x0005 | Propane Testing Protocol (PTP) |
| 0xFFFE | Reserved |
| 0xFFFF | Reserved |

The messaging protocol may be adapted to register for a next available value for the RCM_SubProtocol. Message protocol specific information may be adapted to start at the $6^{th}$ octet in the DCP packet, although the invention is not limited in this regard.

In accordance with an aspect of the invention, the messaging protocol may be utilized for communication between various wireless networking devices and/or clients. In an embodiment of the invention, the messaging protocol may be adapted to facilitate communication between various access points 310, 312, 314, 316, 318, 320 and WLAN switches 306, 308. Information exchanged between these two devices may include, but is not limited to, control, configuration and status information of the device or unit and client session information. The control information may include, for example, signaling information that may be communicated in-band or out-of-band. Such information may be exchanged in order to enable the six features mentioned in the previous section in the WLAN.

The messaging protocol may include a message type. The messaging protocol may include, for example six (6) categories of messages or message types, although the invention is not so limited. These messages and their usage may be illustrated as follows:

AP_Status: from AP to Switch or AP

An AP_Status message may be used to indicate, for example, an access point capacity, bandwidth allocation, the number of attached clients, signal strength, power levels, etc.

AP_Config: from Switch to AP

An AP_Config message may be used to configure an access point to accommodate a client. This may include but is not limited to, 802.11e QoS, security information, etc.

Switch_Status: from Switch to Switch

A Switch_Status message may be used to indicate a switch's association with clients. This may include but is not limited to, session information, access control, QoS parameters, etc.

Switch_Config: from Switch to Switch

A Switch_Config message may be used to configure a WLAN Switch to accommodate a client. This may include but is not limited to, access control, QoS configuration, etc.

Client_Status: from AP to Switch

A Client_Status message may be used to indicate a client's information This may include but is not limited to, client identification, associated MAC address, session status, connecting location, etc.

Device_Discovery: any device to any device

In a client-server model of network services, the Device_Discovery message may be used by a server to discover clients or by client to discover servers. The message may be broadcast to some or all devices in the subnet to draw responses from the intended devices.

In each of the message types above, the message may include, for example four (4) message subtypes—.request, .data, alert, and .ack. A message type/subtype pair of .request and .data may represent the request of data and a corresponding response of data itself. The subtype pair of .alert and .ack may represent the voluntary transmission of data and its acknowledgement. Additionally, there may be two conventions utilized in a message exchange sequence. Accordingly, if a message exchange sequence starts with a request (.req), it may be followed by a reactive transmission of data (.data). Similarly, if a message exchange sequence starts with a proactive transmission of data (.alert), it is followed by an acknowledgement (.ack).

Since the message protocol may be a sub-protocol of DCP, a messaging protocol message may have 6 octets at the front of the TCP/UDP Payload identifying it as a DCP packet. Starting from Octet 6 (0-based), at the beginning of a DCP payload, or a messaging protocol message, 3 octets may be reserved to indicate the message type of a messaging protocol message. In accordance with an aspect of the invention, a filtering engine in the network may be adapted to filter certain types of messaging protocol messages by examining the three octets of a messaging protocol message. In this regard, a messaging protocol message identification system may be implemented.

In accordance with an aspect of the invention, in a case where a messaging protocol (MP) message may be registered with a DCP sub-protocol value of, for example 0x0006, a typical messaging protocol message, as a continuation after the DCP header, may be as follows. Again, the beginning of the DCP header is the first byte of the TCP or UDP payload.

| RCM_MAG-IC_NUMBER (octets 0-3) | RCM_Sub-Protocol (octets 4-5) | MP Message Identifier (octets 6-8) | MP Message Payload (variant # bytes) |
| --- | --- | --- | --- |
| 0x4252434d ("RCM") | 0x0006 | — | — |

The messaging protocol Message Identifier may specify a type of messaging protocol messages as addressed above. The messaging protocol message types may be enumerated in the following table.

| Message Type | value in first two octets of Message Identifier |
| --- | --- |
| AP Status | 0x0001 |
| AP Config | 0x0002 |
| Switch Status | 0x0003 |
| Switch Config | 0x0004 |

-continued

| Message Type | value in first two octets of Message Identifier |
| --- | --- |
| Client Status | 0x0005 |
| Device Discovery | 0x0006 |

The $3^{rd}$ byte of the messaging protocol message identifier may identify a sub-type of the messaging protocol Message. As addressed above, a messaging protocol message may be a data requisition, a data response, a data alert or an acknowledgement. The assigned values are given in the following table.

| Message Sub-type | value in third octet of Message Identifier |
| --- | --- |
| data request (.req) | 0x01 |
| data response (.data) | 0x02 |
| data alert (.alert) | 0x03 |
| acknowledgement (.ack) | 0x04 |

The messaging protocol message payload may be ASCII-based, similar to other IETF protocols such as, real-time streaming protocol (RTSP), hyper-text transport protocol (HTTP), session initiation protocol (SIP), etc. With an ASCII-based protocol, the parameters to be exchanged between devices may be formatted as follows:

<field{.subfield}>: <field value>

It should be recognized that the invention is not limited to the arrangement of the parameters as shown. Notwithstanding, a messaging protocol message in ASCII format may be recognized by inspection. Notably, the messaging protocol message format provides flexibility, in that future revision may be possible by adding new fields.

In accordance with an aspect of the invention, exemplary valid fields and subfields in a messaging protocol message may be as follows:

| Field | Subfields | Descriptions |
| --- | --- | --- |
| Transaction_ID | — | a unique ID identifying the request/data sequence or data/ack sequence |
| Session | ID | a unique ID identifying an association session that the wireless user engaged to the WLAN, this may be a Wireless Laptop logging in, a powered on Wireless VOIP phone, a Wireless PCS, etc. |
|  | Switch_ID | the WLAN switch that governs this session |
|  | AP_ID | the AP associated with this session |
|  | Client_MAC | the client MAC address |
|  | Status | status of a session, whether the wireless station is connected to the network, disconnected from the network, or no traffic has been transmitted in this session; from an AP's perspective, it may be associated or disassociated with the session |
|  | Status_Duration | the time-duration that has reached the status |

-continued

| Field | Subfields | Descriptions |
|---|---|---|
| | Password | password that allows a client station to join the network |
| | Access_Level | level of access allowed for this client session |
| | Access_Duration | Duration of access allowed |
| | Access_Start_TOD | TOD that access may begin |
| | Access_End_TOD | TOD that access must end |
| | Signal | the signal strength of the wireless station received; strongest possible signal = 100 |
| Device | Type | Device type; in the WLAN architecture, it may be all permissible devices, like a switch, an AP, a laptop, a phone, a PCS, etc. |
| | Identity | Device ID |
| | Password | password that allows the device to join the network |
| Target_Device | Type | Used for Device Discovery, Discovery broadcast is meant for a certain type of target device. |
| | Identity | Device ID |
| | Address_Filter | IP Subnet filter such that only addresses filtered through need to respond; this filter is normally an IP subnet address, e.g. 192.168.3.xx, or a manufacturer-specific MAC address, e.g. 00-10-18-XX-XX-XX |
| | Filter_Type | Type of filter, such as IP address or MAC address |
| MAC | — | MAC address of wireless station |
| IP_Addr | — | IP address of wireless station |
| QoS | priority | priority/class given to a specific flow |
| | 802.11e | QoS scheme used by an AP, either EDCF or HCF |
| bitrate | max | maximum bandwidth (in Kbps) allowed for a specific flow |
| | Min | minimum bandwidth (in Kbps) allocated to a specific flow |
| | burst_size | maximum burst size for the traffic flow |
| key | value | encryption key for a particular client |
| | time | time left (in seconds) of the key |
| IP_Subnet | — | IP subnet that a wireless client may be access |
| VLAN | — | VLAN that a wireless client is associated to |
| Flow_Stats | Byte_Count | the number of bytes transmitted for a flow |
| | Packet_Count | the number of packets transmitted for a flow |
| | Drop_Count | the number of packets discarded for a flow |
| | ReMark_Count | the number of packets remarked for a flow |
| | Duration | the time duration for the flow stats since the last reset |
| Class_Stats | Byte_Count | the number of bytes transmitted for a class |
| | Packet_Count | the number of packets transmitted for a class |
| | Drop_Count | the number of packets discarded for a class |
| | ReMark_Count | the number of packets remarked for a class |
| | Duration | the time duration of the class stats since the last reset |
| Roaming | Current_AP | identity of the AP the wireless station is about to disassociate |
| | New_AP | identity of the AP the wireless station is about to associate |
| Classifier | DA | Destination MAC address |
| | SA | Source MAC address |
| | VLAN_ID | VLAN ID |
| | Src_IP | Source IP address to be filter by switch |
| | Dest_IP | Destination IP address to be filtered by switch |
| | Src_Port | Source Port to be filtered by switch |
| | Dest_Port | Destination port to be filtered by switch |
| | Protocol | Layer IV protocol (field in Layer III IP header) to be filtered by switch |
| Filter | Action | Action field when there is an in-profile filter match |
| | Out_Action | Action field when there is an out-profile filter match |
| | 802.1p | 802.1p priority field to be changed as a result of a filter match |
| | DSCP | DSCP field to be changed as a result of a filter match |
| | TOS | TOS field to be changed as a result of a filter match |

In another aspect of the invention, the messaging protocol may be adapted to provide additional enhancements to 802.11 networks beyond those which may be described in the 802.11 standards. These enhancements may occur in exemplary areas such as the detection of rogue network elements. In this regard, upon detecting signal coming from a new access point, a messaging protocol enabled access point may be adapted to send, for example, a Request.ID message to the new access point. The new access point may be adapted to respond with an appropriate network password. If an appropriate network password is received, then the access point may be considered part of the network. Otherwise, an alarm may be sent to a network management entity notifying of the existence of an unidentified access point. The network management entity may be a switch or an access point, although the invention is not limited in this regard. This mechanism may be particularly effective in an isolated domain where there may be minimal or no overlapping coverage from legitimate access points. The messaging protocol may be further used to facilitate the distribution of client access rules between switches during roaming. This feature may enable seamless roaming between access points connected to different switches or on different network domains.

In another embodiment of the invention, the messaging protocol may be adapted to transfer networking monitoring messages such as SNMP and RMON statistics from an old to a new attachment point. In this regard, the messaging protocol may be adapted to enable location-specific management of at least certain clients. This may be achieved by sending client association information to a central management entity which may be aware of the location of the various access points in the network. A decision may subsequently be made to determine whether to allow or disallow access from certain locations in order to balance a load within the network. For example, information pertaining to at least some detected clients may be transferred to a load balancing manager in order to achieve efficient load balancing. In this regard, the load balancing manager may be adapted to receive and assess various client information and effectuate an efficient load balancing. Parameters such as signal strength, access level and device type, may be used to effectuate effective load balancing. Client association/dis-association information may be communicated between the load balancing manager and one or more access points and/or switches. Once the load-balancing manager determines an optimal load configuration, new client and/or access point association information may be passed to the various access points in the network using messaging protocol messages.

In another embodiment of the invention, the messaging protocol may be adapted to transfer QoS parameters from an original switch port to a new switch port to facilitate roaming. This may affect the QoS handling of, for example, downstream traffic destined for the roaming client or access device. In this regard, one or more messaging protocol messages may be used to automatically transfer various pertinent network management parameters. This centralized management may eliminate a need for a distributed management interface, thereby providing a more robust communication system In another embodiment of the invention, the messaging protocol may be adapted to transfer QoS parameters from an old access point to a new access point to facilitate roaming. This may affect upstream traffic from the client to the AP in an HCF environment. In this regard, messaging protocol messages may be used to transfer QoS parameters from the old AP to the new AP. Since this handling of QoS parameters may be similar to the handling of client traffic, the messaging protocol may be used to provide seamless roaming.

Figure 4:
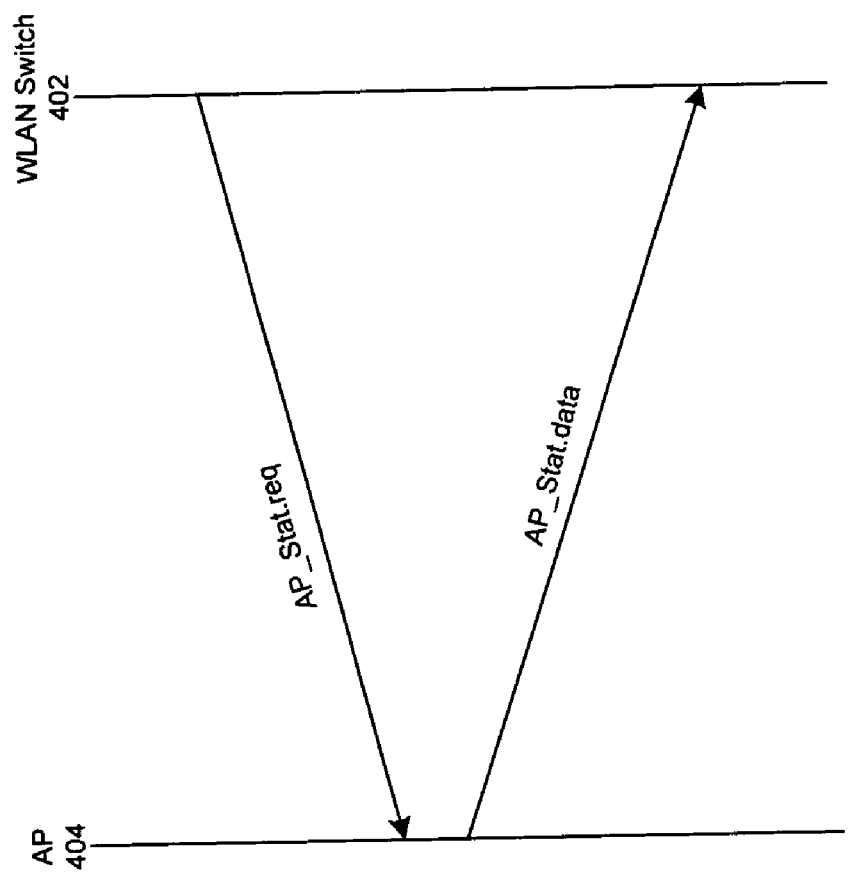
FIG. 4 illustrates an exemplary exchange sequence between a switch and an access point on a status request on the access point using the message protocol in accordance with an aspect of the invention.

In accordance with another aspect of the invention, the messaging protocol may be adapted to acquire access point associated messages, for example in a "Get AP-Associated Sessions." FIG. 4 illustrates an exemplary exchange sequence between a switch 402 and an access point (AP) 404 based on a status request on the access point using the message protocol in accordance with an aspect of the invention. The switch may be a WLAN switch. Referring to FIG. 4, the WLAN switch 402 may request data for at least some of the sessions currently associated with the access point 404 using an AP_Stat.req message. The access point 404 may respond with a AP_Stat.data message. Detailed exemplary AP_Stat.req and AP_Stat.data in accordance with an embodiment of the invention are shown below. For illustrative purposes, the session information may be indicated by a "TBD" which may represent data to be determined (TBD) in the session field.

```
AP_Status.req
    Transaction_ID: 000123223
    Session.AP_ID: AD-1002
    Session.Status: Associated
    Session.*: TBD
AP_Status.data
    Transaction_ID: 000123223
    Session.ID: AD1002-23ECEB141A51-1009
    Session.AP_ID: AD-1002
    Session.Client_MAC: 23.EC.EB.14.1A.51
    Session.Status: Associated
    Session.Duration: 2309
    Session.Signal: 95
    ***
    Session.ID: AD1204-23AC41921A22-1084
    Session.AP_ID: AD-1002
    Session.Client_MAC: 23.AC.41.92.1A.22
    Session.Status: Associated
    Session.Duration: 589
    Session.Signal: 92
    ***
    Session.ID: AD2133-55ABACE29A21-1239
    Session.AP_ID: AD-1002
    Session.Client_MAC: 55.AB.AC.E2.9A.21
    Session.Status: Associated
    Session.Duration: 1004
    Session.Signal: 23
    ***
```

In this message, the access point reports three associated sessions back to the switch. Each associated session is separated by the delimiter "***". Only relevant fields may be reported. In this regard, the switch may not carry the Switch_ID information and thus it is not included in the record. This field may be filled out by the switch itself and included whenever at least a portion of the session information gets transferred from a first switch to a second switch.

Figure 5:
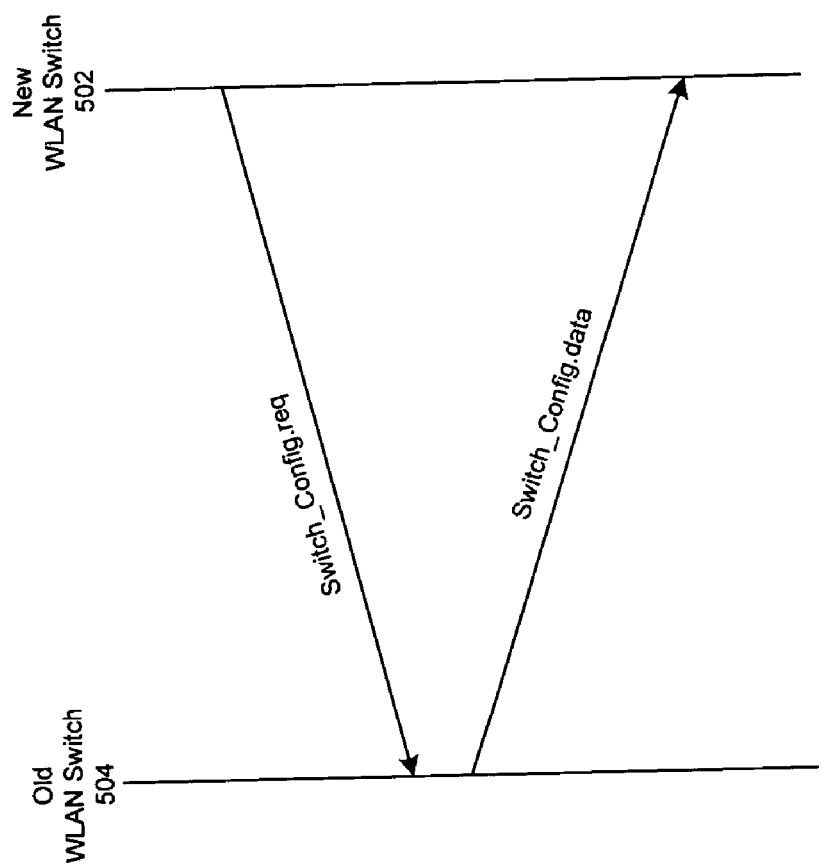
FIG. 5 illustrates a switch filter transfer using the messaging protocol in accordance with an embodiment of the invention.

The message protocol may further be adapted to facilitate switch filter transfer. FIG. 5 illustrates a switch filter transfer using the messaging protocol in accordance with an embodiment of the invention. Whenever a wireless client or access device moves from a first access point coverage region or zone to a second coverage region or zone during a communication session, there is a possibility that the old and new access points may not be connected to the same WLAN switch. In this case, the switching intelligence may be required to transfer the communication session from the old WLAN switch 504 to the new WLAN switch 502. Accordingly, the messaging protocol may facilitate intelligent switching to provide access control and/or QoS management and control.

During the transfer of a communication session from a first old switch 504 to a second new switch 502, switch filter information may have to be transferred from the old switch to the new switch. Referring to FIG. 5, the new switch 502 may be adapted to request switch filter information or configuration information from the old switch 504 using a Switch_Config.req. The old switch 504 may respond with a Switch_Config.data message. In an embodiment of the invention, an exemplary message exchange sequence may be illustrated as follows:

```
Switch_Config.req
    Transaction_ID: 000123225
    Classifier.SA: 23.EC.EB.14.1A.51
    Classifier.*: TBD
    Filter.*: TBD
```

The new switch 502 may issue a request for upstream filtering information of a client device whose MAC address is 23-EC-EB-14-1A-51, for example. The new switch 502 may need at least some or all other classification information for this client device as well as any filtering action that may be configured for this client. An example follows:

```
Switch_Config.data
    Transaction_ID: 000123225
    Classifier.SA: 23.EC.EB.14.1A.51
    Filter.Action: CHANGE_INTERNAL_PRIORITY &CHANGE_DSCP
    Filter.802_1p: 5
    Filter.DSCP: 0xA0
```

The old switch 504 may be adapted to respond with the filtering information or configuration of the client device. While there may be no other fields to be classified for the client device, the invention is not so limited. Notwithstanding, the filtering actions may include, but is not limited to:
  changing an internal priority of the packet to 5; and
  changing a DSCP value of the packet to 0xA0.

Accordingly, this switch filter will be configured in the new switch 502, and removed from the old switch 504

In yet another embodiment of the invention, the messaging protocol may be adapted to locate an access device or client in a WLAN. In this regard, it may be necessary to discover which one of a plurality of access points a client device may be associated with. The whereabouts of a client device may be derived from this discovered association. For example, in a case where access points from three (3) different locations are getting strong signals from a particular client device, but no other access points receive any signal from that particular client device, then the client device may be located in a zone where coverage for the three (3) access points overlap. An actual location of the client device may subsequently be decided by, for example, a server, a switch and/or an access point, after receiving various feedback information from at least one of the three (3) access points. Although the server may be a separate network entity, it may be coupled to and/or associated with the switch and/or the access point.

Figure 6:
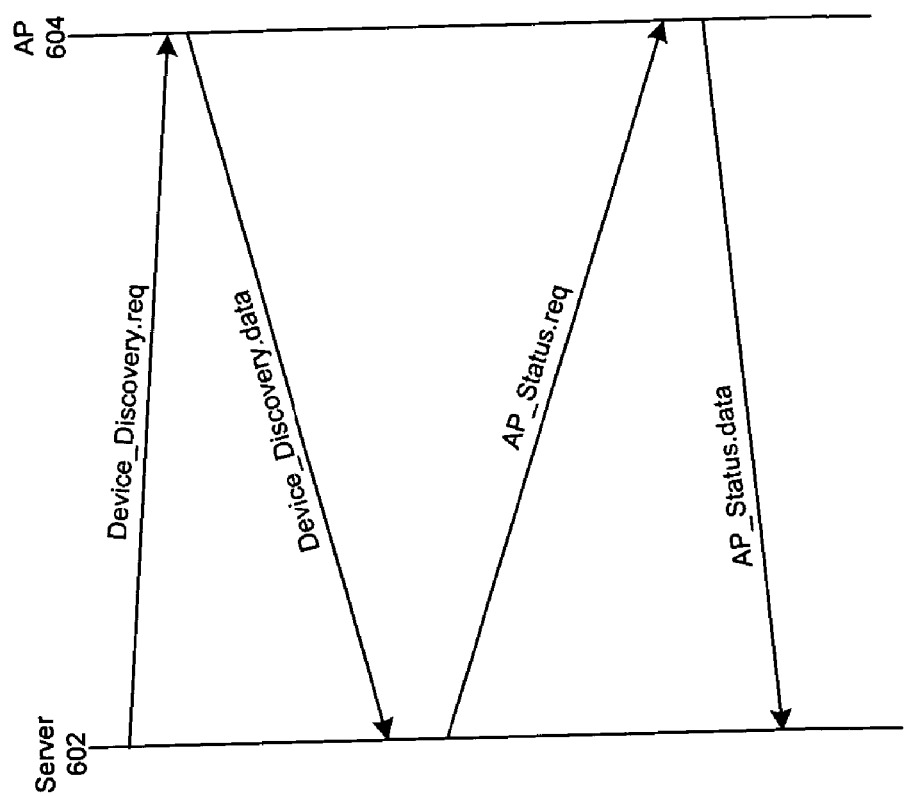
FIG. 6 illustrates an exemplary message exchange between a server and an access point using the messaging protocol in accordance with an aspect of the invention.

FIG. 6 illustrates an exemplary message exchange between a server and an access point using the messaging protocol in accordance with an aspect of the invention. In general, the server 602 may initially send at least one Device_Discovery message to at least some of the access points for example 604, in the IP subnet of 192.168.xx.xx. The server 602 may be associated with a switch and/or access point and may be separate from or integrated therein. Server 602 may broadcast a Device_Discovery message from server 602 to the access points, for example 604, in the subnet. Responsive to replies associated with the Device_Discovery message, the server 602 may send individual AP_Status request messages to each access point, for example 604, located within the subnet.

Referring to FIG. 6, server 602 may send a Device_Discovery.req message to AP 604. AP 604 may respond with a Device_Discovery.data message. Server 602 may send an AP_Status.req to access point 604. Access point 604 may respond with a AP_Status.data message. The following illustrates exemplary messaging protocol messages that may be utilized to discover a client device.

```
Device_Discovery.req
    Transaction_ID: 000123293
    Target_Device.Type: AP
    Target_Device.Address_Filter: 192.168.xx.xx
    Target_Device.Filter_Type: IP
    Target_Device.Identity: TBD
Device_Discovery.data
    Transaction_ID: 000123293
    Target_Device.Type: AP
    Target_Device.Address_Filter: 192.168.xx.xx
    Target_Device.Filter_Type: IP
    Target_Device.Identity: AD-1002
AP_Status.req
    Transaction_ID: 000123294
    Session.Client_MAC: 23.EC.EB.14.1A.51
    Session.AP_ID: AD-1002
    Session.Status: TBD
    Session.Signal: TBD
AP_Status.data
    Transaction_ID: 000123294
    Session.Client_MAC: 23.EC.EB.14.1A.51
    Session.AP_ID: AD-1002
    Session.Status: Associated
    Session.Signal: 85
```

In a case where another client device, for example AD-1082, also receives a strong signal from the client device, but the client device is not associated with that access point, the AP_Status.data response may have the following value:

```
Transaction_ID: 000123295
Session.Client_MAC: 23.EC.EB.14.1A.51
Session.AP_ID: AD-1082
Session.Status: Not-associated
Session.Signal: 79
```

In a case where another access point, for example AD-1203, does not get any signal from the client device, the AP_Status.data response may have the following value:

```
Transaction_ID: 000123296
Session.Client_MAC: 23.EC.EB.14.1A.51
Session.AP_ID: AD-1203
Session.Status: Not-associated
Session.Signal: 0
```

In accordance with another aspect of the invention, the messaging protocol may be adapted to locate a client device or access device within a Wired LAN. The client device or access device may be, for example an IP telephone. An IP telephone and an IP Telephony Gateway (IPTG) may both be message protocol-enabled. In this regard, the IP telephone and the IPTG may exchange messages whenever a client device is first connected to wired LAN. When the IP telephone is coupled to the wired LAN, the IP telephone may first acquire an IP address. Subsequently, the IP telephone may be adapted to send a broadcast message to a subnet of the wired LAN in order to search for the IPTG serving the subnet of the wired LAN. Devices other than the IPTG may ignore the broadcast message. The IPTG may responds with its own client identification. Subsequently, the IP telephone may communicate call processing related messages with the IPTG.

Figure 7:
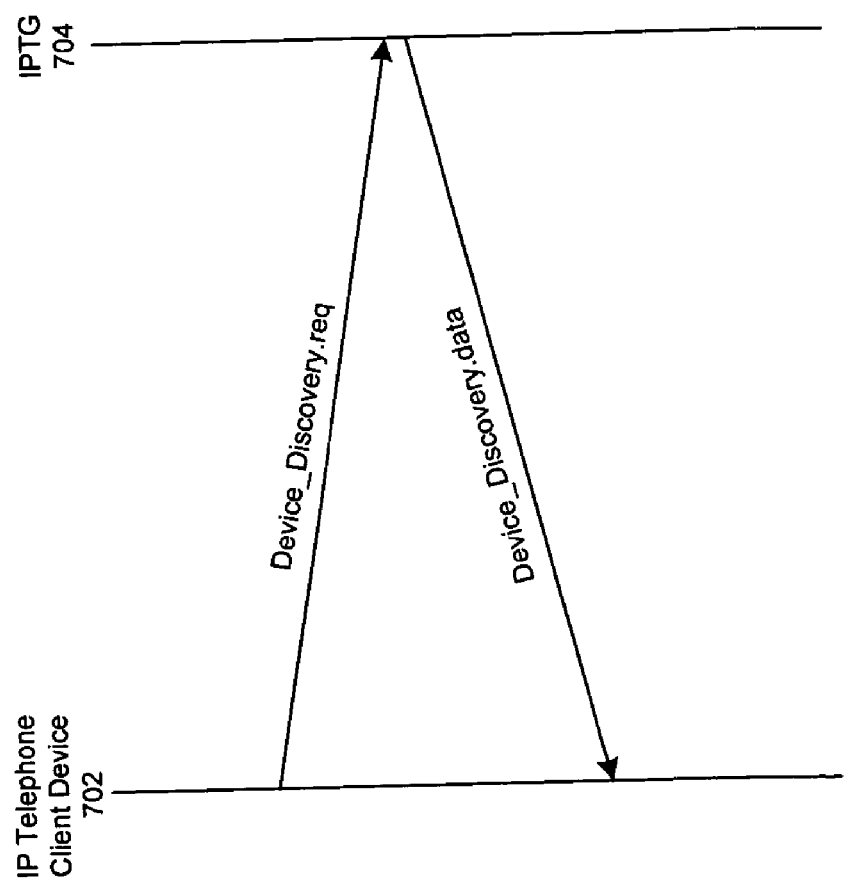
FIG. 7 is an exemplary diagram illustrating an exemplary message exchange for locating a wired client device using the messaging protocol in accordance with an embodiment of the invention.

FIG. 7 is an exemplary diagram illustrating an exemplary message exchange for locating a wired client device using the messaging protocol in accordance with an embodiment of the invention. In general, the client device 702 may first broadcasts a Device_Discovery message to the IP subnet of 192.168.xx.xx, in order to locate the serving IPTG 704. Based on responses associated with the broadcast Device_Discovery message, the IPTG 704 may identify itself with its IP address, for example 192.168.12.22. Referring to FIG. 7, the IP telephone client device 702 may send a Device_Discovery.req to the IPTG 704. The IPTG 704 may respond with a Device_Discovery.data message. The following is an exemplary messaging protocol message that may be utilized for locating a wired client device in accordance with an embodiment of the invention.

```
Device_Discovery.req
    Transaction_ID: 000138293
    Target_Device.Type: IPTG
    Target_Device.Address_Filter: 192.168.xx.xx
    Target_Device.Filter_Type: IP
    Target_Device.Identity: TBD
Device_Discovery.data
    Transaction_ID: 000138293
    Target_Device.Type: IPTG
    Target_Device.Address_Filter: 192.168.xx.xx
    Target_Device.Filter_Type: IP
    Target_Device.Identity: 192.168.12.22
```

In a case where it may be necessary to determine an actual or physical location of an IP phone, any switches located between the IP telephone and the IPTG may be utilized to determine the actual location. In this regard, a client device discovery process may be adapted to have the capability to identify, for example an edge switch, which may be directly connected to the IP phone. Switch information, and/or wiring plan information, may be used to indicate the actual or physical location of a jack in which the IP telephone may be plugged. The switch may include suitable filtering logic and/or software, which may be adapted to filter at least some or all Device_Discovery messages in a messaging protocol message and record some or all IP address and/or physical port mappings. The port may be an edge port in a spanning tree state, which may indicate that the IP telephone may not be connected to another switch. Accordingly, these records may subsequently be sent to the IPTG where it may be stored. Any future query for the physical location of that IP telephone may be answered by searching these records and extracting information from the stored records.

Figure 8:
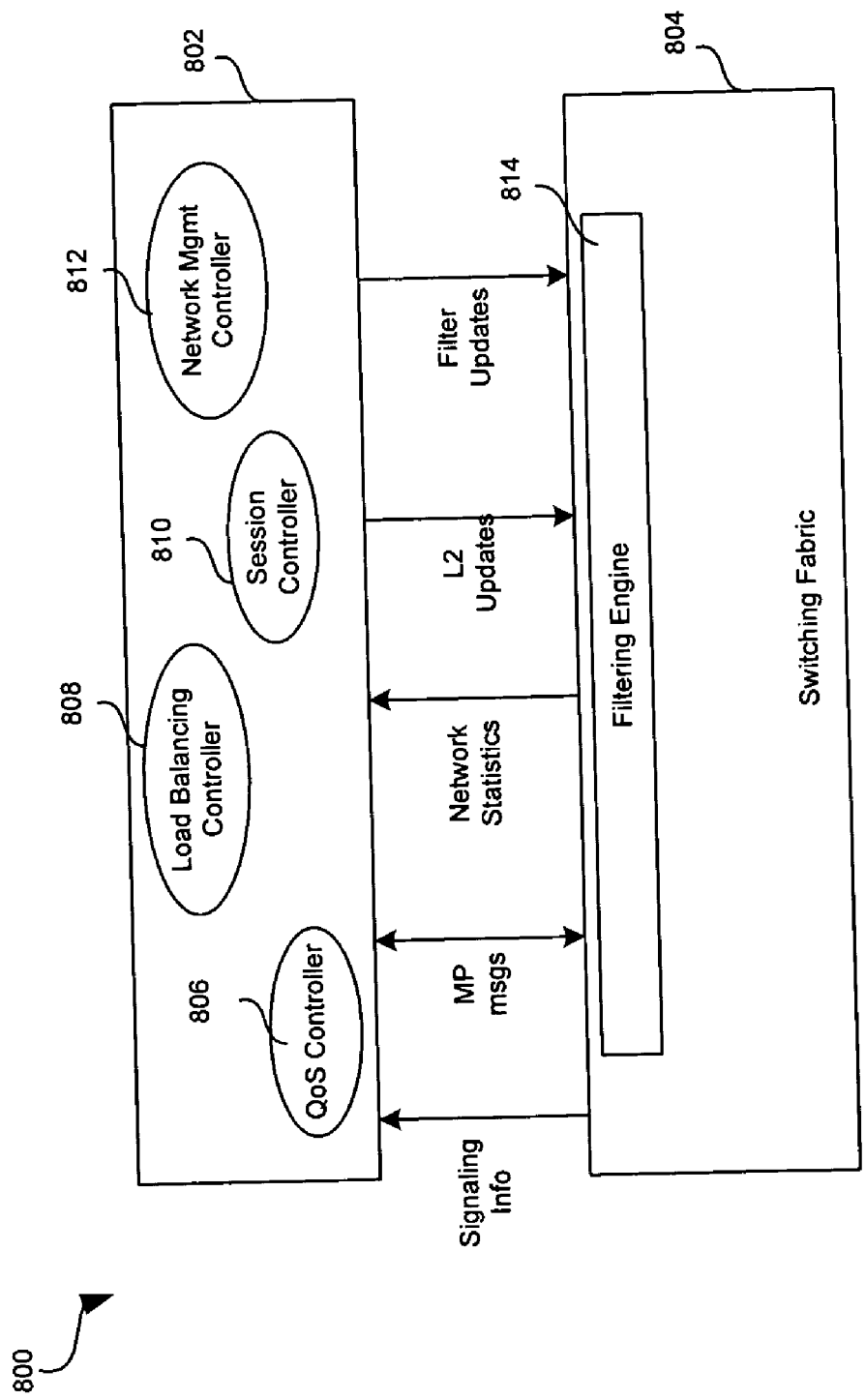
FIG. 8 is a block diagram of an exemplary switching system for network management in a wireless local area network.

FIG. 8 is a block diagram 800 of an exemplary switching system for network management in a wireless local area network. Referring to FIG. 8, there is shown a CPU block 802 and a switching fabric block 804. The CPU block 802 may include a quality of service (QoS) controller block 806, a load balancing controller block 808, a session controller block 810 and a network management control block 812. The switching fabric block 804 may include a filtering engine block 814. The CPU block 802 may be adapted to interface with the switching fabric block 804. One or more of the QoS controller block 806, load balancing controller block 808, session controller block 810 and network management control block 812 may interface directly with the filtering engine block 814.

In operation, selected signaling packets may be communicated from the switching fabric block 804 to one or more of the QoS controller block 806, load balancing controller block 808, session controller block 810 and network management control block 812. Messaging protocol messages may be used to facilitate communication between the switching fabric block 804 and one or more of the QoS controller block 806, load balancing controller block 808, session controller block 810 and network management control block 812. The selected signaling packets may include, but are not limited to, VoIP packets, and streaming media packets including voice, video and data. The filtering engine block 814 may be adapted to filter information received from one or more of the QoS controller block 806, load balancing controller block 808, session controller block 810 and a network management control block 812. In this regard, the filtering engine block 814 may be adapted to filter messaging protocol messages used to control switching functions, network traffic statistics messages, layer two (2) address update messages, and filter update messages. The filter update messages may include, but is not limited to, access control messages, QoS messages and load balancing messages.

In accordance with an embodiment of the invention, the switching system for network management may include a session control process that may be adapted to manage and control at least one client database and session information for some or all active clients. The session control process may be configured to enforce access control based on, for example, a client session, a subnet, a network management application, and switch ports. Access control, for example, may be used to facilitate load balancing in at least a portion of the network. The session control process may also control and manage switching intelligence for roaming.

Figure 9:
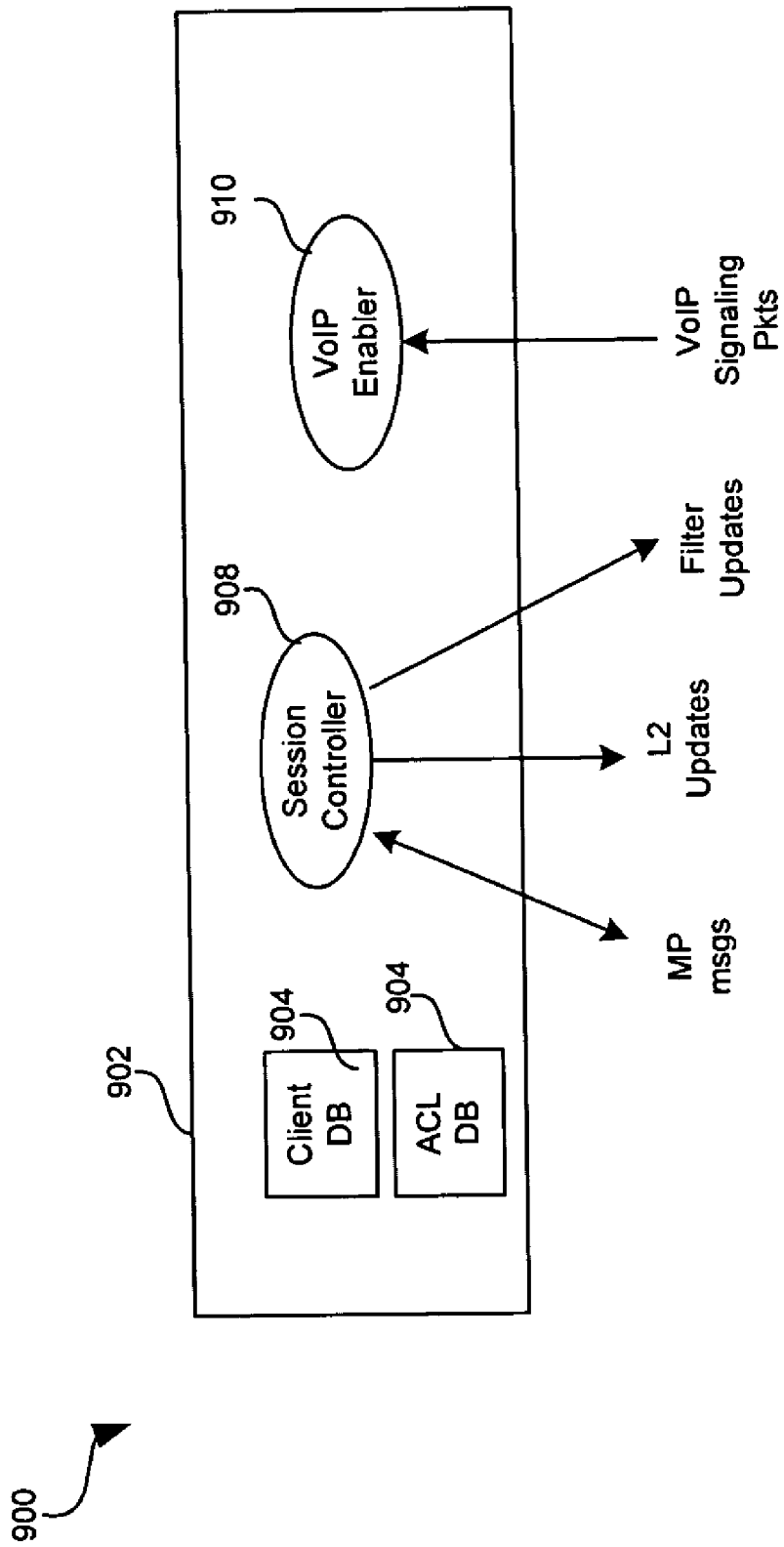
FIG. 9 is a block diagram of an exemplary session control process as described in FIG. 8 that may be utilized by the switching system for network management in accordance with an embodiment of the invention.

FIG. 9 is a block diagram 900 of an exemplary session control process as described in FIG. 8 that may be utilized by the switching system for network management in accordance with an embodiment of the invention. Referring to FIG. 9, there is shown a session control process 902 having a client database 904, an access control list (ACL) database 906, a session control manager 908 and a VoIP enabler 910. One or more interfaces may be adapted to provide communication between session manager 908 and the client database 904 and the ACL database 906. The session manager 908 may include at least one interface that may be adapted to facilitate communication with the VoIP enabler 910.

In operation, the session control manager 908 may be adapted to process messaging protocol messages, layer two (2) updates, and filter updates. The session control manager 908 may be adapted to receive information from one or more of client database 904 and ACL database 906. The VoIP enabler 910 may be adapted to process VoIP signaling packets. VoIP enabler 910 may also be adapted to decode various standards-based VoIP signaling packets and prioritize filter setup.

In an embodiment of the invention, the switching system may include a load balancing process that may be adapted to obtain access point load from, for example a network management process. The network management process may include but is not limited to SNMP, RMON, RMON2, and MIB. The load balancing process may be adapted to keep an access point database on, for example, a plurality or bank of access points. The load balancing process may include necessary intelligence for making load distribution decisions.

Figure 10:
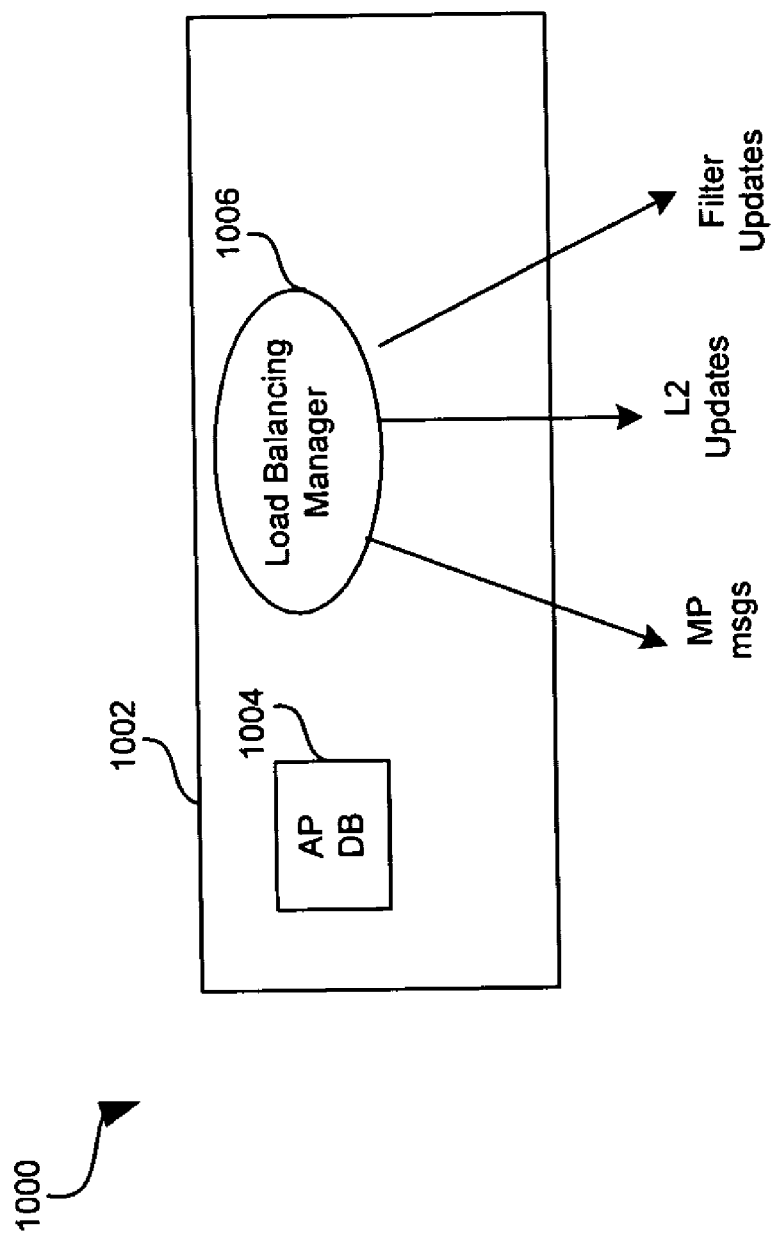
FIG. 10 is a block diagram of an exemplary load balancing process as described in FIG. 8 that may be utilized by the switching system for network management in accordance with an embodiment of the invention.

FIG. 10 is a block diagram 1000 of an exemplary load balancing process as described in FIG. 8 that may be utilized by the switching system for network management in accordance with an embodiment of the invention. Referring to FIG. 10, there is shown a load balancing process 1002 having an access point database 1004 and a load balancing manager 1006. At least one interface may be adapted to provide communication between access point database 1004 and the load balancing manager 1006. The load balancing manager 1006 may be adapted to include at least one interface that may facilitate communication with a network management process.

In operation, the load balancing manager 1006 may be adapted to process messaging protocol messages, layer two (2) updates, and filter updates. The load balancing manager 1006 may receive network statistics from a one or more network management processes. Information from the access point database 1004 may be utilized by the load balancing manager 1006 for making load balancing decisions.

In an embodiment of the invention, the switching system for network management may include a QoS enabling process that may be adapted to control and manage activities such as, traffic policing, metering filters, and protocol configurations. In this regard, the QoS enabling process may be adapted to manage, for example, 8012.11e based configurations that may be sent to the access point. A VoIP enabler may be adapted to decode various standard-based VoIP signaling packets and prioritize filter setup.

Figure 11:
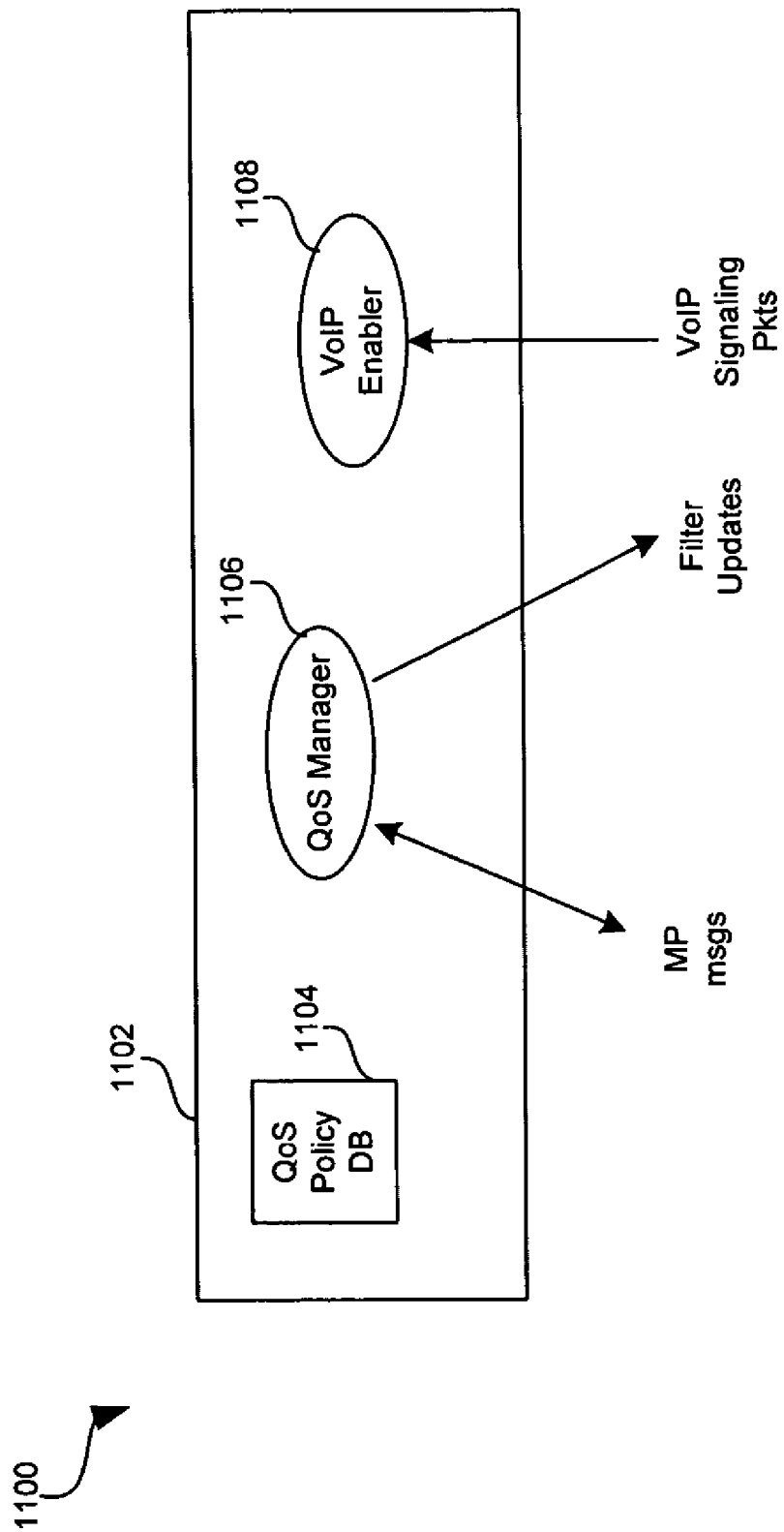
FIG. 11 is a block diagram of an exemplary QoS enabling process as described in FIG. 8 that may be utilized by an the switching system for network management in accordance with an embodiment of the invention.

FIG. 11 is a block diagram 1100 of an exemplary QoS enabling process as described in FIG. 8 that may be utilized by an the switching system for network management in accordance with an embodiment of the invention. Referring to FIG. 11, there is shown QoS enabling process 1102 having QoS policy database 1104, a QoS manager 1106 and a VoIP enabler 1108. At least one interface may be adapted to provide communication between QoS policy database 1104 and the QoS manager 1106. The QoS manager 1106 may be adapted to include at least one interface that may facilitate communication with, for example, the VoIP enabler 1108.

In operation, the QoS manager 1106 may be adapted to process, for example, messaging protocol messages, and filter updates. The QoS manager 1106 may send and receive VoIP signaling information to and from VoIP enabler 1108. Information from the QoS policy database 1104 may be utilized by the QoS manager 1106 for making QoS decisions.

In accordance with another embodiment of the invention, dependent on the modulation scheme utilized, one or more of the PLCP frames illustrated in FIG. 1*b*, FIG. 1*c*, FIG. 1*d* and FIG. 1*e* may be adapted to contain information which may be utilized for providing communication in accordance with various embodiments of the invention. Additionally, the PLCP frames may be adapted to convey information for any one or more of the 801.11a, 802.11b and 802.11g modes of operation utilized by access points and/or access devices in accordance the embodiments of the invention.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for providing communication in a hybrid wired/wireless local area network, the method comprising:
communicating at least a first messaging protocol message between a first switch and one or both of a second switch and/or a first access point;
responsive to said communicated at least a first messaging protocol message, communicating at least a second messaging protocol message between said one or both of said second switch and/or said first access point, and at least a second access point; and
controlling one or more of said first switch, said second switch, said first access point, said second access point, and/or at least one of a plurality of access devices using one or both of said at least a first messaging protocol message and/or said at least a second messaging protocol message.

2. The method according to claim 1, comprising generating said at least a first messaging protocol message by said first switch.

3. The method according to claim 1, comprising generating said at least a second messaging protocol message by said one or both of said second switch and/or said first access point.

4. The method according to claim 1, wherein said at least a first messaging protocol message and said at least a second messaging protocol message comprise an access point status message communicated between said first access point and said second access point.

5. The method according to claim 1, wherein said at least a first messaging protocol message and said at least a second messaging protocol message comprise at least one access point configuration message communicated from one or both of said first switch and/or said second switch, to one or both of said first access point and/or said second access point.

6. The method according to claim 1, wherein said at least a first messaging protocol message and said at least a second messaging protocol message comprise least one switch status message communicated between said first switch and said second switch.

7. The method according to claim 1, wherein said at least a first messaging protocol message and said at least a second messaging protocol message comprise at least one switch configuration message communicated between said first switch and said second switch.

8. The method according to claim 1, wherein said at least a first messaging protocol message and said at least a second messaging protocol message comprise at least one client status message communicated from one or both of said first access point and/or said second access point, to one or both of said first switch and/or said second switch.

9. The method according to claim 1, wherein said at least a first messaging protocol message and said at least a second messaging protocol message comprise at least a device discovery message communicated between said first switch and said second switch, between said first switch and one or both of said first access point and/or said second access point, and between said first access point and one or both of said second access point and/or said at least one of said plurality of access devices.

10. The method according to claim 9, wherein said at least a first messaging protocol message and said at least a second messaging protocol message comprise at least one switch status message communicated between said first switch and said second switch.

11. A machine-readable storage, having stored thereon a computer program having at least one code section for providing communication in a hybrid wired/wireless local area network, the at least one code section executable by a machine for causing the machine to perform the steps comprising:
communicating at least a first messaging protocol message between a first switch and one or both of a second switch and/or a first access point;

responsive to said communicated at least a first messaging protocol message, communicating at least a second messaging protocol message between said one or both of said second switch and/or said first access point, and at least a second access point; and controlling one or more of said first switch, said second switch, said first access point, said second access point, and/or at least one of a plurality of access devices using one or both of said at least a first messaging protocol message and/or said at least a second messaging protocol message.

12. The machine-readable storage according to claim 11, comprising code for generating said at least a first messaging protocol message by said first switch.

13. The machine-readable storage according to claim 11, comprising code for generating said at least a second messaging protocol message by said one or both of said second switch and/or said first access point.

14. The machine-readable storage according to claim 11, wherein said at least a first messaging protocol message and said at least a second messaging protocol message comprise an access point status message communicated between said first access point and said second access point.

15. The machine-readable storage according to claim 11, wherein said at least a first messaging protocol message and said at least a second messaging protocol message comprise at least one access point configuration message communicated from one or both of said first switch and/or said second switch, to one or both of said first access point and/or said second access point.

16. The machine-readable storage according to claim 11, wherein said at least a first messaging protocol message and said at least a second messaging protocol message comprise at least one switch status message communicated between said first switch and said second switch.

17. The machine-readable storage according to claim 11, wherein said at least a first messaging protocol message and said at least a second messaging protocol message comprise at least one switch configuration message communicated between said first switch and said second switch.

18. The machine-readable storage according to claim 11, wherein said at least a first messaging protocol message and said at least a second messaging protocol message comprise at least one client status message communicated from one or both of said first access point and/or said second access point, to one or both of said first switch and/or said second switch.

19. The machine-readable storage according to claim 11, wherein said at least a first messaging protocol message and said at least a second messaging protocol message comprise at least a device discovery message communicated between said first switch and said second switch, between said first switch and one or both of said first access point and/or said second access point, and between said first access point and one or both of said second access point and/or said at least one of said plurality of access devices.

20. The machine-readable storage according to claim 19, wherein said at least a first messaging protocol message and said at least a second messaging protocol message comprise at least one switch status message communicated between said first switch and said second switch.

21. A system for providing communication in a hybrid wired/wireless local area network, the system comprising:

at least one processor for communicating at least a first messaging protocol message between a first switch and one or both of a second switch and/or a first access point;

said at least one processor communicates at least a second messaging protocol message between said one or both of said second switch and/or said first access point, and at least a second access point, in response to said communicated at least a first messaging protocol message; and said at least one processor controls one or more of said first switch, said second switch, said first access point, said second access point, and/or at least one of a plurality of access devices using one or both of said at least a first messaging protocol message and/or said at least a second messaging protocol message.

22. The system according to claim 21, wherein said at least one processor generates said at least a first messaging protocol message by said first switch.

23. The system according to claim 21, wherein said at least one processor generates said at least a second messaging protocol message by said one or both of said second switch and/or said first access point.

24. The system according to claim 21, wherein said at least a first messaging protocol message and said at least a second messaging protocol message comprise an access point status message communicated between said first access point and said second access point.

25. The system according to claim 21, wherein said at least a first messaging protocol message and said at least a second messaging protocol message comprise at least one access point configuration message communicated from one or both of said first switch and/or said second switch, to one or both of said first access point and/or said second access point.

26. The system according to claim 21, wherein said at least a first messaging protocol message and said at least a second messaging protocol message comprise at least one switch status message communicated between said first switch and said second switch.

27. The system according to claim 21, wherein said at least a first messaging protocol message and said at least a second messaging protocol message comprise at least one switch configuration message communicated between said first switch and said second switch.

28. The system according to claim 21, wherein said at least a first messaging protocol message and said at least a second messaging protocol message comprise at least one client status message communicated from one or both of said first access point and/or said second access point, to one or both of said first switch and/or said second switch.

29. The system according to claim 21, wherein said at least a first messaging protocol message and said at least a second messaging protocol message comprise at least a device discovery message communicated between said first switch and said second switch, between said first switch and one or both of said first access point and/or said second access point, and between said first access point and one or both of said second access point and/or said at least one of said plurality of access devices.

30. The system according to claim 29, wherein said at least a first messaging protocol message and said at least a second messaging protocol message comprise at least one switch status message communicated between said first switch and said second switch.

* * * * *

UNITED STATES PATENT AND TRADEMARK OFFICE
CERTIFICATE OF CORRECTION

| | | |
|---|---|---|
| PATENT NO. | : 7,526,312 B2 | Page 1 of 1 |
| APPLICATION NO. | : 10/607094 | |
| DATED | : April 28, 2009 | |
| INVENTOR(S) | : Richard Martin | |

It is certified that error appears in the above-identified patent and that said Letters Patent is hereby corrected as shown below:

Claim 1, column 22, line 9, after "at least", please delete "a" and insert --said--.

Claim 2, column 22, line 13, after "at least", please delete "a" and insert --said--.

Signed and Sealed this

Second Day of June, 2009

JOHN DOLL
*Acting Director of the United States Patent and Trademark Office*